(12) United States Patent
Gao et al.

(10) Patent No.: US 9,462,457 B2
(45) Date of Patent: Oct. 4, 2016

(54) SUBSCRIPTION TRANSFER METHOD, APPARATUS, AND SYSTEM

(71) Applicant: Huawei Device Co., Ltd., Shenzhen (CN)

(72) Inventors: Linyi Gao, Beijing (CN); Hui Jin, Beijing (CN); Guodong Xue, Shenzhen (CN); Qiang Yi, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/705,294

(22) Filed: May 6, 2015

(65) Prior Publication Data
US 2015/0237496 A1 Aug. 20, 2015

Related U.S. Application Data

(63) Continuation of application No. PCT/CN2013/086644, filed on Nov. 6, 2013.

(30) Foreign Application Priority Data

Nov. 6, 2012 (CN) .......................... 2012 1 0437614

(51) Int. Cl.
*H04W 8/20* (2009.01)
*H04W 88/06* (2009.01)
*H04B 1/3816* (2015.01)

(52) U.S. Cl.
CPC ........... *H04W 8/205* (2013.01); *H04B 1/3816* (2013.01); *H04W 88/06* (2013.01)

(58) Field of Classification Search
CPC ..... H04W 8/205; H04W 88/06; H04W 8/04; H04W 8/06; H04W 8/08; H04B 1/3816
USPC .......................................... 455/414.1, 414.2
See application file for complete search history.

(56) References Cited

U.S. PATENT DOCUMENTS

2009/0036126 A1\* 2/2009 Morikuni .............. H04W 12/08 455/435.2
2010/0279674 A1 11/2010 Zou et al.
(Continued)

FOREIGN PATENT DOCUMENTS

| CN | 1787665 A | 6/2006 |
|---|---|---|
| CN | 101119387 A | 2/2008 |
| WO | 2012076464 A1 | 6/2012 |

OTHER PUBLICATIONS

"Embedded UICC, A High Level Remote Provisioning Architecture," GSMA Embedded SIM Task Force: Technical stream, Dec. 6, 2012, 16 pages.
(Continued)

*Primary Examiner* — Cong Tran
(74) *Attorney, Agent, or Firm* — Conley Rose, P.C.; Grant Rodolph; Nicholas K. Beaulieu

(57) ABSTRACT

A subscription transfer method, apparatus, and system are provided. The method includes receiving a subscription transfer request message sent by a first user equipment (UE) or a second UE, where the first UE is a target UE to which an embedded universal integrated circuit card (eUICC) subscription is transferred, and the second UE is a source UE from which the eUICC subscription is transferred; and transferring the eUICC subscription from the second UE to the first UE according to the subscription transfer request message, so that the first UE accesses an operator network according to transferred eUICC subscription data. The technical solution of the present invention can implement transfer of an eUICC subscription between UEs that use an eUICC, making it more flexible and convenient for a user to change a UE.

10 Claims, 18 Drawing Sheets

(56) References Cited

U.S. PATENT DOCUMENTS

| | | |
|---|---|---|
| 2012/0115440 A1 | 5/2012 | Naito et al. |
| 2012/0190354 A1 | 7/2012 | Merrien et al. |
| 2014/0011541 A1* | 1/2014 | Cormier .............. H04W 8/183 455/558 |
| 2014/0012755 A1* | 1/2014 | Walker ............... G06Q 20/085 705/44 |

OTHER PUBLICATIONS

"Embedded SIM Task Force Requirements and Use Cases," GSM Association, Version 1.0, Feb. 21, 2011, 38 pages.

Foreign Communication From A Counterpart Application, European Application No. 13852843.5, Extended European Search Report dated Oct. 28, 2015, 10 pages.

Partial English Translation and Abstract of Chinese Patent Application No. CN1787665A, 2015, 7 pages.

Foreign Communication From A Counterpart Application, PCT Application No. PCT/CN2013/086644, English Translation of International Search Report dated Jan. 23, 2014, 4 pages.

Foreign Communication From A Counterpart Application, PCT Application No. PCT/CN2013/086644, English Translation of Written Opinion dated Jan. 23, 2014, 17 pages.

* cited by examiner

# SUBSCRIPTION TRANSFER METHOD, APPARATUS, AND SYSTEM

CROSS-REFERENCE TO RELATED APPLICATIONS

This application is a continuation of International Application No. PCT/CN2013/086644, filed on Nov. 6, 2013, which claims priority to Chinese Patent Application No. 201210437614.7, filed on Nov. 6, 2012, both of which are hereby incorporated by reference in their entireties.

TECHNICAL FIELD

Embodiments of the present invention relate to communications technologies, and in particular, to a subscription transfer method, apparatus, and system.

BACKGROUND

An embedded universal integrated circuit card (eUICC) is a non-pluggable smart card that can be used in a user equipment (UE). A greatest difference from a conventional universal integrated circuit card (UICC) is that an eUICC is fixed in a UE and cannot be replaced freely. Software functions of the two cards are basically consistent. The eUICC has an advantage of a small volume, which saves space of UE components and provides good shockproof performance.

With respect to a conventional UICC, when changing a UE, a user may move the UICC from an old UE to a new UE and reserve a subscription on the UICC at the user's discretion. After the UE is changed, the user may still use user data on the UICC card, and thereby can access an operator network. However, with respect to a UE using an eUICC, when the UE is changed due to reasons such as a fault or a user requirement, the prior art cannot transfer an eUICC subscription between UEs that use the eUICC, and therefore, it is inconvenient and inflexible for the user to change the UE.

SUMMARY

Embodiments of the present invention provide a subscription transfer method, apparatus, and system, which are used to implement transfer of an eUICC subscription between UEs that use an eUICC, so that it is more flexible and convenient for a user to change a UE.

According to a first aspect, a subscription transfer method is provided, including receiving a subscription transfer request message sent by a first UE or a second UE, where the first UE is a target UE to which an eUICC subscription is transferred, and the second UE is a source UE from which the eUICC subscription is transferred; and transferring the eUICC subscription from the second UE to the first UE according to the subscription transfer request message, so that the first UE accesses an operator network according to transferred eUICC subscription data.

In a first possible implementation manner of the first aspect, before the transferring the eUICC subscription from the second UE to the first UE according to the subscription transfer request message, the method further includes sending an authentication request message to a service provider (SP) device, so that the SP device determines whether to allow the eUICC subscription transfer; and receiving an authentication response message sent by the SP device.

According to the first aspect or the first possible implementation manner of the first aspect, in a second possible implementation manner, before the transferring the eUICC subscription from the second UE to the first UE according to the subscription transfer request message, the method further includes sending a data transfer command message to the second UE; and receiving user data that is sent by the second UE according to the data transfer command message, where the user data includes user data stored in an eUICC of the second UE and/or user data stored in a storage unit of the second UE.

According to the second possible implementation manner of the first aspect, in a third possible implementation manner, the method further includes sending the user data to the first UE.

With reference to the first aspect or the first, second, or third possible implementation manner of the first aspect, in a fourth possible implementation manner, after the transferring the eUICC subscription from the second UE to the first UE, the method further includes sending a data deletion command to the second UE, so that the second UE deletes the subscription data stored in the eUICC.

With reference to the first aspect or the first, second, third, or fourth possible implementation manner of the first aspect, in a fifth possible implementation manner, the transferring the eUICC subscription from the second UE to the first UE according to the subscription transfer request message includes sending a subscription transfer notification message to a device in a mobile network operator (MNO) network, where the subscription transfer notification message includes identity information of the first UE and identity information of the second UE, so that the device in the MNO network replaces the identity information of the second UE in the subscription data with the identity information of the first UE; receiving a subscription transfer acknowledgement message fed back by the device in the MNO network; sending an operational profile (OP) request message that includes the identity information of the first UE and the identity information of the second UE to a subscription manager—data preparation (SM-DP) module, so that the SM-DP module replaces the identity information of the second UE corresponding to an OP with the identity information of the first UE to obtain an updated OP; and receiving the updated OP sent by the SM-DP module, and sending the updated OP to the first UE.

With reference to the first aspect or the first, second, third, or fourth possible implementation manner of the first aspect, in a sixth possible implementation manner, the transferring the eUICC subscription from the second UE to the first UE according to the subscription transfer request message includes sending a subscription modification request message that includes identity information of the first UE and identity information of the second UE to a device in an MNO network, so that the device in the MNO network assigns new network access authentication parameters to the first UE, uses the new network access authentication parameters and the identity information of the first UE to replace network access authentication parameters corresponding to the second UE and the identity information of the second UE in the subscription data, and uses the new network access authentication parameters and the identity information of the first UE to request an SM-DP module to generate an OP corresponding to the first UE; receiving a subscription transfer acknowledgement message fed back by the device in the MNO network; sending an OP request message that includes the identity information of the first UE to the SM-DP module; and receiving an OP sent by the SM-DP module, and sending the OP to the first UE.

According to a second aspect, a subscription transfer method is provided, including receiving a subscription transfer notification message sent by a subscription manager—secure routing (SM-SR) module, where the subscription transfer notification message includes identity information of a first UE and identity information of a second UE, where the first UE is a target UE to which an eUICC subscription is transferred, and the second UE is a source UE from which the eUICC subscription is transferred; replacing the identity information of the second UE in subscription data with the identity information of the first UE; and feeding back a subscription transfer acknowledgement message to the SM-SR module, so that upon reception of the subscription transfer acknowledgement message, the SM-SR module uses an OP request message that includes the identity information of the first UE and the identity information of the second UE to request an SM-DP module to replace the identity information of the second UE corresponding to an OP with the identity information of the first UE to obtain an updated OP, and receives the updated OP sent by the SM-DP module, and then sends the updated OP to the first UE.

According to a third aspect, a subscription transfer method is provided, including receiving a subscription modification request message that is sent by an SM-SR module and includes identity information of a first UE and identity information of a second UE, where the first UE is a target UE to which an eUICC subscription is transferred, and the second UE is a source UE from which the eUICC subscription is transferred; assigning new network access authentication parameters to the first UE, and using the new network access authentication parameters and the identity information of the first UE to replace network access authentication parameters corresponding to the second UE and the identity information of the second UE in subscription data; sending an OP request message that includes the new network access authentication parameters and the identity information of the first UE to an SM-DP module, so that the SM-DP module generates an OP corresponding to the first UE; and feeding back a subscription transfer acknowledgement message to the SM-SR module, so that upon reception of the subscription transfer acknowledgement message, the SM-SR module sends an OP request message that includes the identity information of the first UE to the SM-DP module, receives the OP sent by the SM-DP module, and sends the OP to the first UE.

According to a fourth aspect, a subscription transfer method is provided, including receiving an OP request message that is sent by an SM-SR module and includes identity information of a first UE and identity information of a second UE, where the first UE is a target UE to which an eUICC subscription is transferred, and the second UE is a source UE from which the eUICC subscription is transferred; replacing the identity information of the second UE corresponding to an OP with the identity information of the first UE to obtain an updated OP; and sending the updated OP to the SM-SR module, so that the SM-SR module sends the updated OP to the first UE.

According to a fifth aspect, a subscription transfer method is provided, including receiving an OP request message, which is sent by a device in an MNO network after network access authentication parameters corresponding to a second UE and identity information of the second UE in subscription data are replaced with new network access authentication parameters and identity information of a first UE and which includes the new network access authentication parameters and the identity information of the first UE, where the new network access authentication parameters are network access authentication parameters assigned to the first UE after the device in the MNO network receives a subscription modification request message that is sent by an SM-SR module and that includes the identity information of the first UE and the identity information of the second UE, the first UE is a target UE to which an eUICC subscription is transferred, and the second UE is a source UE from which the eUICC subscription is transferred; generating, according to the new network access authentication parameters and the identity information of the first UE, an OP corresponding to the first UE; receiving an OP request message that is sent by the SM-SR module and includes the identity information of the first UE; and sending the OP corresponding to the first UE to the SM-SR module, so that the SM-SR module sends the OP to the first UE.

According to a sixth aspect, an SM-SR module is provided, including a first receiving module configured to receive a subscription transfer request message sent by a first UE or a second UE, where the first UE is a target UE to which an eUICC subscription is transferred, and the second UE is a source UE from which the eUICC subscription is transferred; and a first processing module configured to transfer the eUICC subscription from the second UE to the first UE according to the subscription transfer request message, so that the first UE accesses an operator network according to transferred eUICC subscription data.

In a first possible implementation manner of the sixth aspect, the SM-SR module further includes a first sending module configured to, before the first processing module transfers the eUICC subscription from the second UE to the first UE, send an authentication request message to an SP device, so that the SP device determines whether to allow the eUICC subscription transfer, where the first receiving module is further configured to receive an authentication response message sent by the SP device.

According to the sixth aspect or the first possible implementation manner of the sixth aspect, in a second possible implementation manner, the first sending module is further configured to send a data transfer command message to the second UE before the first processing module transfers the eUICC subscription from the second UE to the first UE; and the first receiving module is further configured to receive user data that is sent by the second UE according to the data transfer command message, where the user data includes user data stored in an eUICC of the second UE and/or user data stored in a storage unit of the second UE.

According to the second possible implementation manner of the sixth aspect, in a third possible implementation manner, the first sending module is further configured to send the user data to the first UE.

With reference to the six aspect or the first, second, or third possible implementation manner of the sixth aspect, in a fourth possible implementation manner, the first sending module is further configured to send a data deletion command to the second UE, so that the second UE deletes the subscription data stored in the eUICC.

With reference to the sixth aspect or the first, second, third, or fourth possible implementation manner of the sixth aspect, in a fifth possible implementation manner, the first processing module is configured to send a subscription transfer notification message to a device in an MNO network, where the subscription transfer notification message includes identity information of the first UE and identity information of the second UE, so that the device in the MNO network replaces the identity information of the second UE in the subscription data with the identity information of the first UE; receive a subscription transfer acknowledgement message fed back by the device in the MNO network; send an OP request message that includes the identity information of the first UE and the identity information of the second UE to an SM-DP module, so that the SM-DP module replaces the identity information of the second UE corresponding to an OP with the identity information of the first UE to obtain an updated OP; and receive the updated OP sent by the SM-DP module, and send the updated OP to the first UE.

With reference to the sixth aspect or the first, second, third, or fourth possible implementation manner of the sixth aspect, in a sixth possible implementation manner, the first processing module is configured to send a subscription modification request message that includes identity information of the first UE and identity information of the second UE to a device in an MNO network, so that the device in the MNO network assigns new network access authentication parameters to the first UE, uses the new network access authentication parameters and the identity information of the first UE to replace network access authentication parameters corresponding to the second UE and the identity information of the second UE in the subscription data, and uses the new network access authentication parameters and the identity information of the first UE to request an SM-DP module to generate an OP corresponding to the first UE; receive a subscription transfer acknowledgement message fed back by the device in the MNO network; send an OP request message that includes the identity information of the first UE to the SM-DP module; and receive an OP sent by the SM-DP module, and send the OP to the first UE.

According to a seventh aspect, a device in an MNO network is provided, including a second receiving module configured to receive a subscription transfer notification message sent by an SM-SR module, where the subscription transfer notification message includes identity information of a first UE and identity information of a second UE, where the first UE is a target UE to which an eUICC subscription is transferred, and the second UE is a source UE from which the eUICC subscription is transferred; a second processing module configured to replace the identity information of the second UE in subscription data with the identity information of the first UE; and a second sending module configured to feed back a subscription transfer acknowledgement message to the SM-SR module, so that upon reception of the subscription transfer acknowledgement message, the SM-SR module uses an OP request message that includes the identity information of the first UE and the identity information of the second UE to request an SM-DP module to replace the identity information of the second UE corresponding to an OP with the identity information of the first UE to obtain an updated OP, and receives the updated OP sent by the SM-DP module, and then sends the updated OP to the first UE.

According to an eighth aspect, a device in an MNO network is provided, including a third receiving module configured to receive a subscription modification request message that is sent by an SM-SR module and includes identity information of a first UE and identity information of a second UE, where the first UE is a target UE to which an eUICC subscription is transferred, and the second UE is a source UE from which the eUICC subscription is transferred; a third processing module configured to assign new network access authentication parameters to the first UE, and use the new network access authentication parameters and the identity information of the first UE to replace network access authentication parameters corresponding to the second UE and the identity information of the second UE in subscription data; and a third sending module configured to send an OP request message that includes the new network access authentication parameters and the identity information of the first UE to an SM-DP module, so that the SM-DP module generates an OP corresponding to the first UE; where the third sending module is further configured to feed back a subscription transfer acknowledgement message to the SM-SR module, so that upon reception of the subscription transfer acknowledgement message, the SM-SR module sends an OP request message that includes the identity information of the first UE to the SM-DP module, receives the OP sent by the SM-DP module, and sends the OP to the first UE.

According to a ninth aspect, an SM-DP module is provided, including a fourth receiving module configured to receive an OP request message that is sent by an SM-SR module and includes identity information of a first UE and identity information of a second UE, where the first UE is a target UE to which an eUICC subscription is transferred, and the second UE is a source UE from which the eUICC subscription is transferred; a fourth processing module configured to replace the identity information of the second UE corresponding to an OP with the identity information of the first UE to obtain an updated OP; and a fourth sending module configured to send the updated OP to the SM-SR module, so that the SM-SR module sends the updated OP to the first UE.

According to a tenth aspect, an SM-DP module is provided, including a fifth receiving module configured to receive an OP request message, which is sent by a device in an MNO network after network access authentication parameters corresponding to a second UE and identity information of the second UE in subscription data are replaced with new network access authentication parameters and identity information of a first UE and which includes the new network access authentication parameters and the identity information of the first UE, where the new network access authentication parameters are network access authentication parameters assigned to the first UE after the device in the MNO network receives a subscription modification request message that is sent by an SM-SR module and that includes the identity information of the first UE and the identity information of the second UE, the first UE is a target UE to which an eUICC subscription is transferred, and the second UE is a source UE from which the eUICC subscription is transferred; a fifth processing module configured to generate, according to the new network access authentication parameters and the identity information of the first UE, an OP corresponding to the first UE, where the fifth receiving module is further configured to receive an OP request message that is sent by the SM-SR module and includes the identity information of the first UE; and a fifth sending module configured to send the OP corresponding to the first UE to the SM-SR module, so that the SM-SR module sends the OP to the first UE.

According to an eleventh aspect, a system is provided, including the SM-SR module according to the sixth aspect or any one of the first to fifth possible implementation manners of the sixth aspect, and/or the device in an MNO network according to the seventh aspect, and/or the SM-DP module according to the ninth aspect.

According to a twelfth aspect, a system is provided, including the SM-SR module according to the sixth aspect or any one of the first to fourth possible implementation manners or the sixth possible implementation manner of the sixth aspect, and/or the device in an MNO network according to the eighth aspect, and/or the SM-DP module according to the tenth aspect.

In the subscription transfer method, apparatus, and system provided by the embodiments, a subscription transfer request message sent by a first UE or a second UE is received; and an eUICC subscription is transferred from the second UE to the first UE according to the subscription transfer request message, so that the first UE accesses an operator network according to transferred eUICC subscription data. Thereby, transfer of an eUICC subscription between UEs that use an eUICC can be implemented, and it is more flexible and convenient for a user to change a UE.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. The described embodiments are some but not all of the embodiments of the present invention. All other embodiments obtained by persons of ordinary skill in the art based on the embodiments of the present invention without creative efforts shall fall within the protection scope of the present invention.

Figure 1:
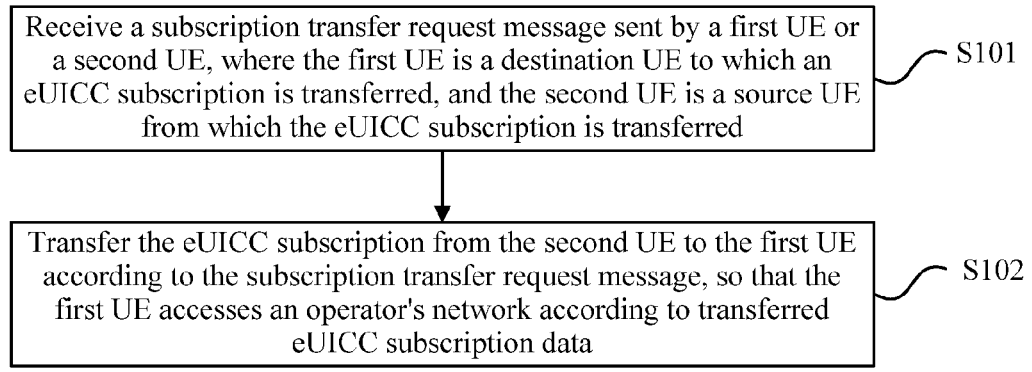
FIG. 1 is a flowchart of Embodiment 1 of a subscription transfer method according to the present invention.

FIG. 1 is a flowchart of Embodiment 1 of a subscription transfer method according to the present invention. As shown in FIG. 1, the subscription transfer method in this embodiment may include the following steps.

S101. Receive a subscription transfer request message sent by a first UE or a second UE, where the first UE is a target UE to which an eUICC subscription is transferred, and the second UE is a source UE from which the eUICC subscription is transferred.

For example, if the first UE initiates subscription transfer, the subscription transfer request message may carry an embedded universal integrated circuit card identity (eUICC identity or eID for short) and/or an international mobile equipment identity (IMEI) of the first UE, an address or identity of an SP device, information of the second UE, and a subscription transfer indication, where the SP may also be an MNO; if the second UE initiates subscription transfer, the subscription transfer request message may carry an eID and/or IMEI of the second UE, an address or identity of an SP device, information of the first UE, and a subscription transfer indication. The SP device may obtain the eID and/or IMEI of the first UE or the eID and/or IMEI of the second UE by performing a query according to the information of the first UE or the information of the second UE, and may request an SM-DP module to convert the eID of the first UE or the eID of the second UE into an integrated circuit card identity (ICCID) of the first UE or an ICCID of the second UE.

The information of the first UE or the information of the second UE may include identity information assigned to a user by an SP and identity information of the first UE or second UE, and is used for dual authentication on the first UE or second UE so as to prevent other people from illegally transferring a subscription of the second UE. The eID may be a globally unique identity of an eUICC.

The first UE and second UE may be UEs using the eUICC, for example, mobile phones, tablet personal computers, personal digital assistants, and electricity meters. The first UE may be a UE that needs to acquire the subscription, and the second UE may be a UE that transfers the subscription.

S102. Transfer the eUICC subscription from the second UE to the first UE according to the subscription transfer request message, so that the first UE accesses an operator network according to transferred eUICC subscription data.

For example, the ICCID of the second UE in an OP used for access to the operator network may be replaced with the ICCID of the first UE, and then the updated OP is sent to the first UE to implement transfer of the eUICC subscription from the second UE to the first UE.

An entity executing the foregoing steps may be an SM-SR module.

In the subscription transfer method provided by this embodiment, a subscription transfer request message sent by a first UE or a second UE is received; and an eUICC subscription is transferred from the second UE to the first UE according to the subscription transfer request message, so that the first UE accesses an operator network according to transferred eUICC subscription data. Thereby, transfer of an eUICC subscription between UEs that use an eUICC can be implemented, and it is more flexible and convenient for a user to change a UE.

Figure 2:
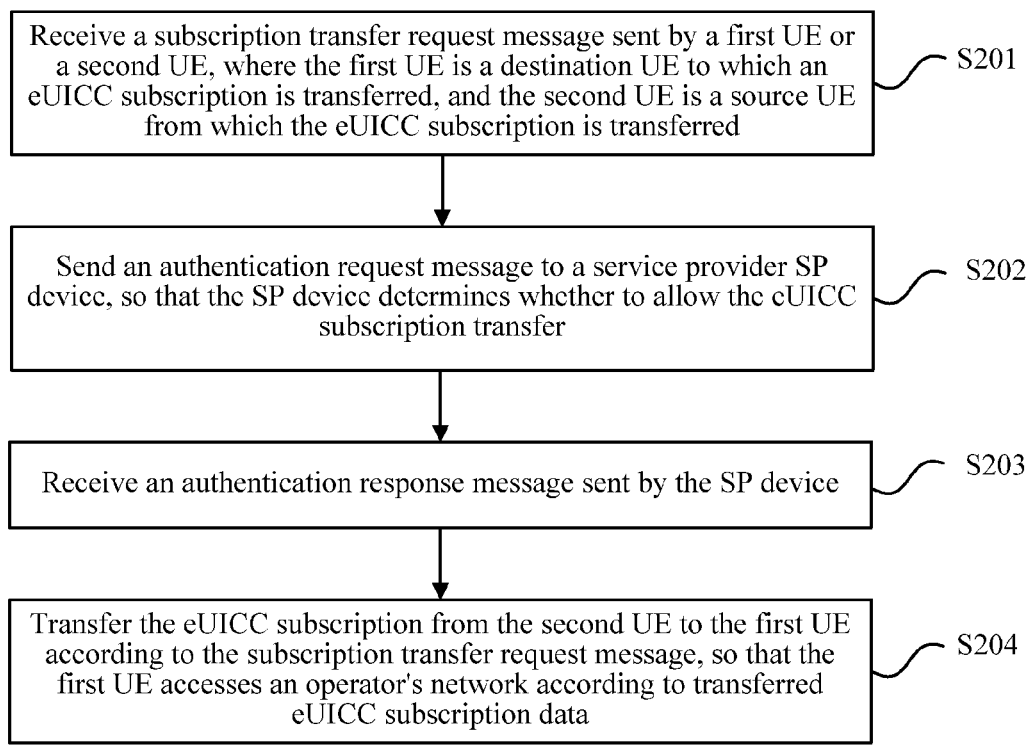
FIG. 2 is a flowchart of Embodiment 2 of a subscription transfer method according to the present invention.

FIG. 2 is a flowchart of Embodiment 2 of a subscription transfer method according to the present invention. As shown in FIG. 2, on a basis of the embodiment shown in FIG. 1, the subscription transfer method in this embodiment may include the following steps.

S201. Receive a subscription transfer request message sent by a first UE or a second UE, where the first UE is a target UE to which an eUICC subscription is transferred, and the second UE is a source UE from which the eUICC subscription is transferred.

S202. Send an authentication request message to an SP device, so that the SP device determines whether to allow the eUICC subscription transfer.

For example, a binding relationship may exist between the subscription and a brand and model of a UE. If the first UE, that is, the target UE to which the subscription is transferred, does not meet requirements of the subscription on the brand and model of the UE, it is possible that transfer of the subscription to the first UE is not allowed.

S203. Receive an authentication response message sent by the SP device.

For example, the authentication response message may carry an indication indicating whether the subscription transfer is allowed. If the subscription transfer is allowed, the authentication response message further carries an ICCID and an IMEI of the second UE.

S204. Transfer the eUICC subscription from the second UE to the first UE according to the subscription transfer request message, so that the first UE accesses an operator network according to transferred eUICC subscription data.

An entity executing the foregoing steps may be an SM-SR module.

In the subscription transfer method provided by this embodiment, a subscription transfer request message sent by a first UE or a second UE is received; authentication is performed by an SP device; and after the authentication is successful, an eUICC subscription is transferred from the second UE to the first UE according to the subscription transfer request message, so that the first UE accesses an operator network according to transferred eUICC subscription data. Thereby, secure legal transfer of an eUICC subscription between UEs that use an eUICC can be implemented, and it is more flexible and convenient for a user to change a UE.

Figure 3:
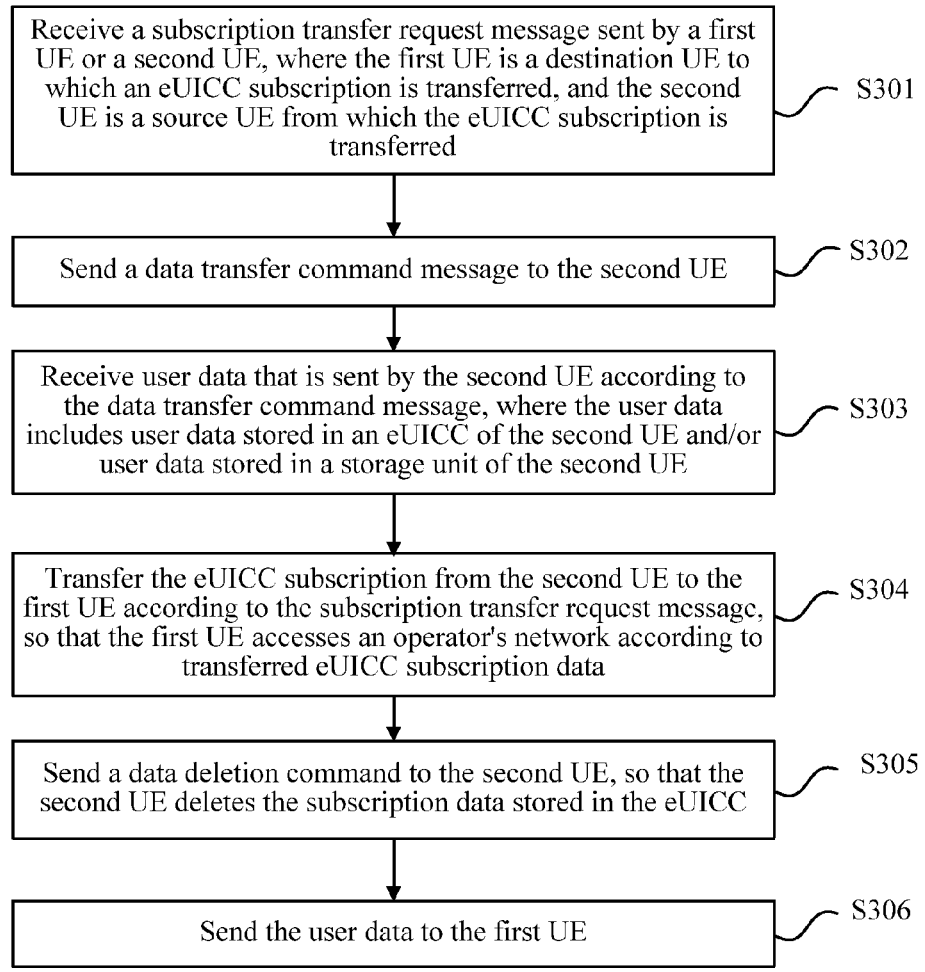
FIG. 3 is a flowchart of Embodiment 3 of a subscription transfer method according to the present invention.

FIG. 3 is a flowchart of Embodiment 3 of a subscription transfer method according to the present invention. As shown in FIG. 3, on a basis of the embodiment shown in FIG. 1, the subscription transfer method in this embodiment may include the following steps.

S301. Receive a subscription transfer request message sent by a first UE or a second UE, where the first UE is a target UE to which an eUICC subscription is transferred, and the second UE is a source UE from which the eUICC subscription is transferred.

S302. Send a data transfer command message to the second UE.

The data transfer command message may carry a subscription transfer indication, which is used to indicate data transfer initiated to perform the subscription transfer.

S303. Receive user data that is sent by the second UE according to the data transfer command message, where the user data includes user data stored in an eUICC of the second UE and/or user data stored in a storage unit of the second UE.

Temporarily stored user data includes personal data (such as an address book and electricity meter readings), applications, and so on. If the user data can be carried in signaling, the user data may be carried in a data transfer response message. Otherwise, if the amount of data is large or a data format does not allow transfer in signaling, the second UE may request to create a data bearer to transfer the user data.

Further, optionally, an SM-SR module may store the user data, or the user data is sent to an SM-DP module for storage.

The user data may be stored in the SM-SR module or SM-DP module.

S304. Transfer the eUICC subscription from the second UE to the first UE according to the subscription transfer request message, so that the first UE accesses an operator network according to transferred eUICC subscription data.

S305. Send a data deletion command to the second UE, so that the second UE deletes the subscription data stored in the eUICC.

This step can ensure that the second UE that has transferred the user data out cannot access the network any more.

Further, a user may selectively delete the user data stored in the eUICC of the second UE and/or the user data stored in the storage unit of the second UE.

S306. Send the user data to the first UE.

It is understandable that if the user data is stored in an SM-DP module, the SM-DP module first sends the user data to the SM-SR module, and then the SM-SR module sends the user data to the first UE.

Further, optionally, the user data stored locally by the SM-SR module may be deleted, or the SM-SR module sends a deletion notification message to an SM-DP module, so that the SM-DP module deletes the stored user data.

An entity executing the foregoing steps may be an SM-SR module.

In the subscription transfer method provided by this embodiment, a subscription transfer request message sent by a first UE or a second UE is received; user data that is sent by the second UE according to the data transfer command message is received; an eUICC subscription is transferred from the second UE to the first UE according to the subscription transfer request message, so that the first UE accesses an operator network according to transferred eUICC subscription data; and then the user data is sent to the first UE. Thereby, transfer of subscription data and user data between UEs that use an eUICC can be implemented, and it is more flexible and convenient for a user to change a UE.

Figure 4:
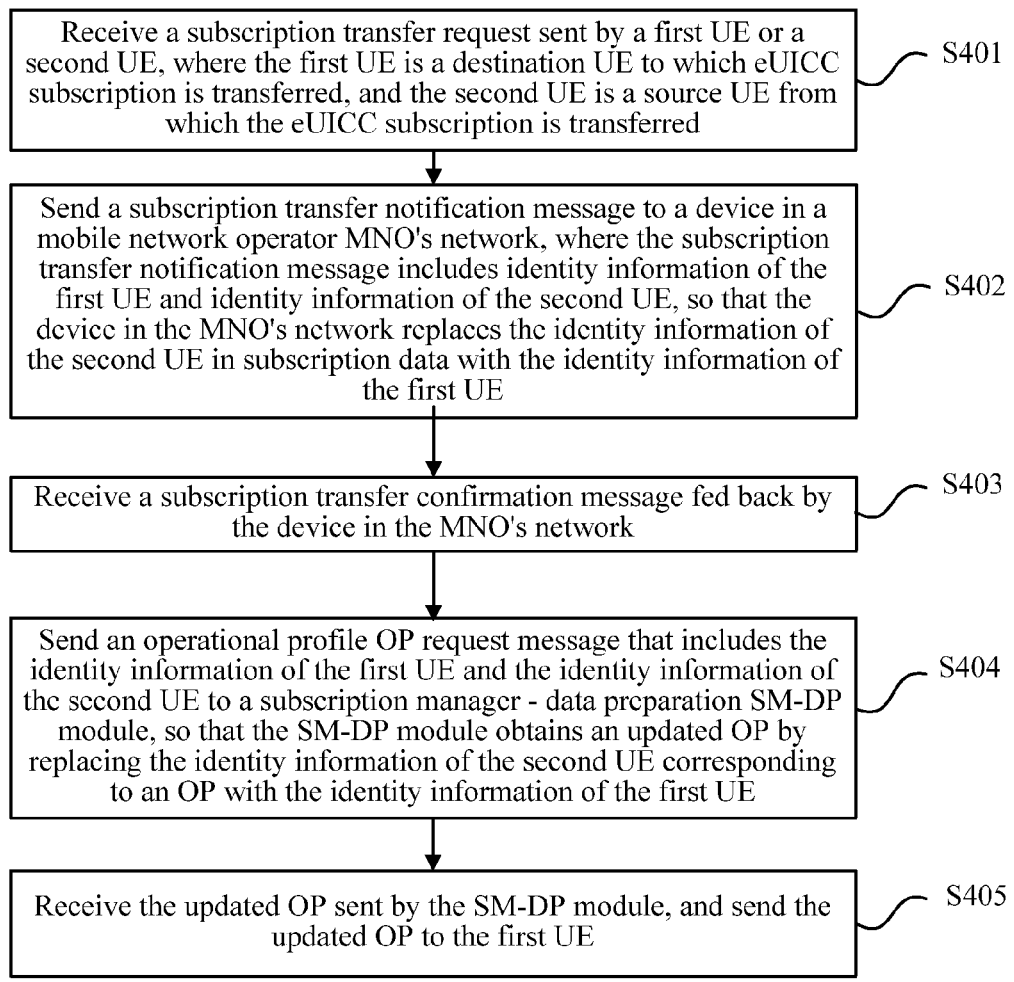
FIG. 4 is a flowchart of Embodiment 4 of a subscription transfer method according to the present invention.

FIG. 4 is a flowchart of Embodiment 4 of a subscription transfer method according to the present invention. As shown in FIG. 4, on a basis of the embodiment shown in FIG. 1, the subscription transfer method in this embodiment includes the following steps.

S401. Receive a subscription transfer request message sent by a first UE or a second UE, where the first UE is a target UE to which an eUICC subscription is transferred, and the second UE is a source UE from which the eUICC subscription is transferred.

S402. Send a subscription transfer notification message to a device in an MNO network, where the subscription transfer notification message includes identity information of the first UE and identity information of the second UE, so that the device in the MNO network replaces the identity information of the second UE in subscription data with the identity information of the first UE.

For example, the identity information of the first UE may include an ICCID and/or an IMEI of the first UE, and the identity information of the second UE may include an ICCID and/or an IMEI of the second UE. The subscription transfer notification message may further include a subscription transfer indication used to indicate that subscription transfer will be performed between the first UE and the second UE. If the subscription data in the network of the MNO includes an ICCID and/or an IMEI, the device in the MNO network replaces the ICCID and/or IMEI of the second UE in the subscription data with the ICCID and/or IMEI of the first UE. The ICCID and IMEI may be stored in a home location register (HLR) or a home subscriber server (HSS), or stored in other network nodes.

Replacing the ICCID and/or IMEI in the subscription data in the device in the MNO network may ensure that after the subscription transfer, the MNO network can recognize the first UE and provide services for the first UE.

Another possible implementation manner of S402 may be as follows. First, a subscription transfer notification message is sent to an SM-DP module, where the subscription transfer notification message carries an eID and/or an IMEI of the first UE, an eID and/or an IMEI of the second UE, and a subscription transfer indication; upon reception of the subscription transfer notification message, the SM-DP module converts the received eID of the first UE and eID of the second UE into the ICCID of the first UE and the ICCID of the second UE; then the SM-DP module sends a subscription transfer notification message to the device in the MNO network, where the subscription transfer notification message carries the ICCID and/or IMEI of the first UE, the ICCID and/or IMEI of the second UE, and the subscription transfer indication; if the subscription data in the MNO network includes an ICCID and/or an IMEI, the device in the MNO network replaces the ICCID and/or IMEI of the second UE in the subscription data with the ICCID and/or IMEI of the first UE.

It is understandable that in a case in which the subscription data in the MNO network does not include the ICCID and IMEI of the second UE, the device in the MNO network does not need to replace the identity information of the UE.

S403. Receive a subscription transfer acknowledgement message fed back by the device in the MNO network.

S404. Send an OP request message that includes the identity information of the first UE and the identity information of the second UE to an SM-DP module, so that the SM-DP module replaces the identity information of the second UE corresponding to an OP with the identity information of the first UE to obtain an updated OP.

For example, according to the OP request message, the SM-DP module may replace the ICCID of the second UE corresponding to the OP with the ICCID of the first UE.

S405. Receive the updated OP sent by the SM-DP module, and send the updated OP to the first UE.

The UE may access the operator network by using the OP. Therefore, the SM-DP replaces the ICCID of the second UE corresponding to the OP with the ICCID of the first UE to obtain the updated OP, and sends the updated OP to the SM-SR module, and then the SM-SR sends the updated OP to the first UE. Therefore, the first UE may obtain the updated OP in the subscription transfer process.

An entity executing the foregoing steps may be an SM-SR module.

In the subscription transfer method provided by this embodiment, a subscription transfer request message sent by a first UE or a second UE is received, so that a device in an MNO network replaces identity information of the second UE in subscription data with identity information of the first UE, and that an SM-DP module replaces the identity information of the second UE corresponding to an OP with the identity information of the first UE; and then the OP is sent to the first UE. Thereby, transfer of an eUICC subscription between UEs that use an eUICC can be implemented, and it is more flexible and convenient for a user to change a UE.

Figure 5:
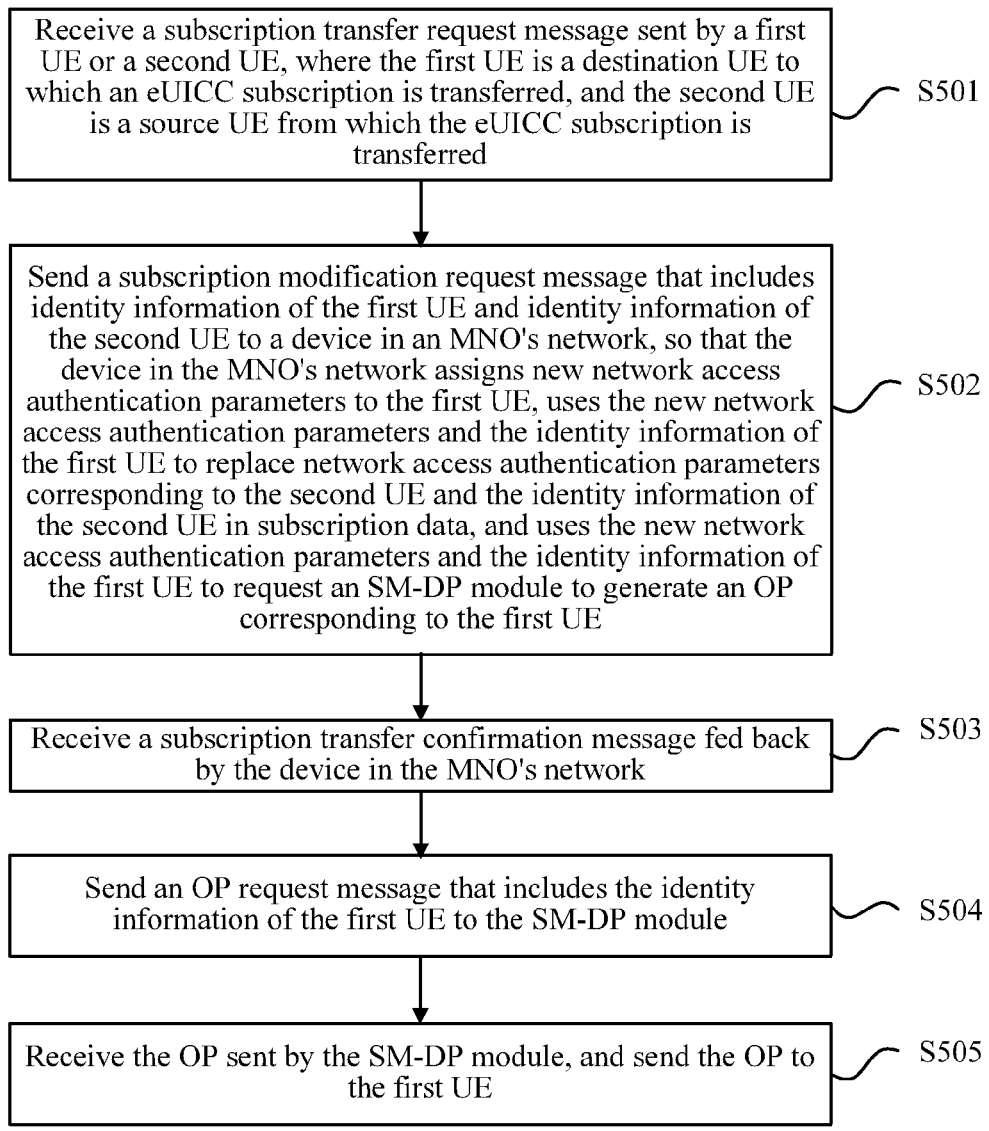
FIG. 5 is a flowchart of Embodiment 5 of a subscription transfer method according to the present invention.

FIG. 5 is a flowchart of Embodiment 5 of a subscription transfer method according to the present invention. As shown in FIG. 5, on a basis of the embodiment shown in FIG. 1, the subscription transfer method in this embodiment includes the following steps.

S501. Receive a subscription transfer request message sent by a first UE or a second UE, where the first UE is a target UE to which an eUICC subscription is transferred, and the second UE is a source UE from which the eUICC subscription is transferred.

S502. Send a subscription modification request message that includes identity information of the first UE and identity information of the second UE to a device in an MNO network, so that the device in the MNO network assigns new network access authentication parameters to the first UE, uses the new network access authentication parameters and the identity information of the first UE to replace network access authentication parameters corresponding to the second UE and the identity information of the second UE in subscription data, and uses the new network access authentication parameters and the identity information of the first UE to request an SM-DP module to generate an OP corresponding to the first UE.

For example, the subscription modification request message may be used to indicate a situation in which the second UE is lost. The device in the MNO network assigns the new network access authentication parameters such as an international mobile subscriber identity (IMSI) and authentication key K to the first UE according to the received subscription modification request message, and uses the newly assigned network access authentication parameters and an ICCID and/or an IMEI of the first UE to replace old network access authentication parameters and an ICCID and/or an IMEI of the second UE in the subscription data.

Another possible implementation manner of S502 may be as follows. First, a subscription transfer notification message is sent to the SM-DP module, where the subscription transfer notification message carries an eID and/or an IMEI of the first UE, an eID and/or an IMEI of the second UE, and a subscription transfer indication; upon reception of the subscription transfer notification message, the SM-DP converts the received eID of the first UE and eID of the second UE into the ICCID of the first UE and the ICCID of the second UE; and then the SM-DP module sends a subscription transfer notification message to the device in the MNO network, where the subscription transfer notification message carries the ICCID and/or IMEI of the first UE, the ICCID and/or IMEI of the second UE, and the subscription transfer indication, so that the device in the MNO network assigns the new network access authentication parameters to the first UE, uses the new network access authentication parameters and the identity information of the first UE to replace the old network access authentication parameters and the identity information of the second UE in the subscription data, and uses the new network access authentication parameters and the identity information of the first UE to request the SM-DP module to generate the OP corresponding to the first UE.

It is understandable that in a case in which the subscription data in the MNO network does not include the ICCID and IMEI of the second UE, the device in the MNO network does not need to replace the identity information of the UE.

S503. Receive a subscription transfer acknowledgement message fed back by the device in the MNO network.

S504. Send an OP request message that includes the identity information of the first UE to the SM-DP module.

S505. Receive an OP sent by the SM-DP module, and send the OP to the first UE.

In the subscription transfer method provided by this embodiment, a subscription transfer request message sent by a first UE is received; and then a subscription modification request message is sent to a device in an MNO network, so that the device in the MNO network assigns new network access authentication parameters to the first UE, and uses the new network access authentication parameters and identity information of the first UE to replace old network access authentication parameters and identity information of the second UE in subscription data; the device in the MNO's network requests an SM-DP module to generate a new OP for the first UE, and sends the generated OP to the first UE. Thereby, transfer of an eUICC subscription between UEs that use an eUICC can be implemented, and it is more flexible and convenient for a user to change a UE.

Figure 6A:
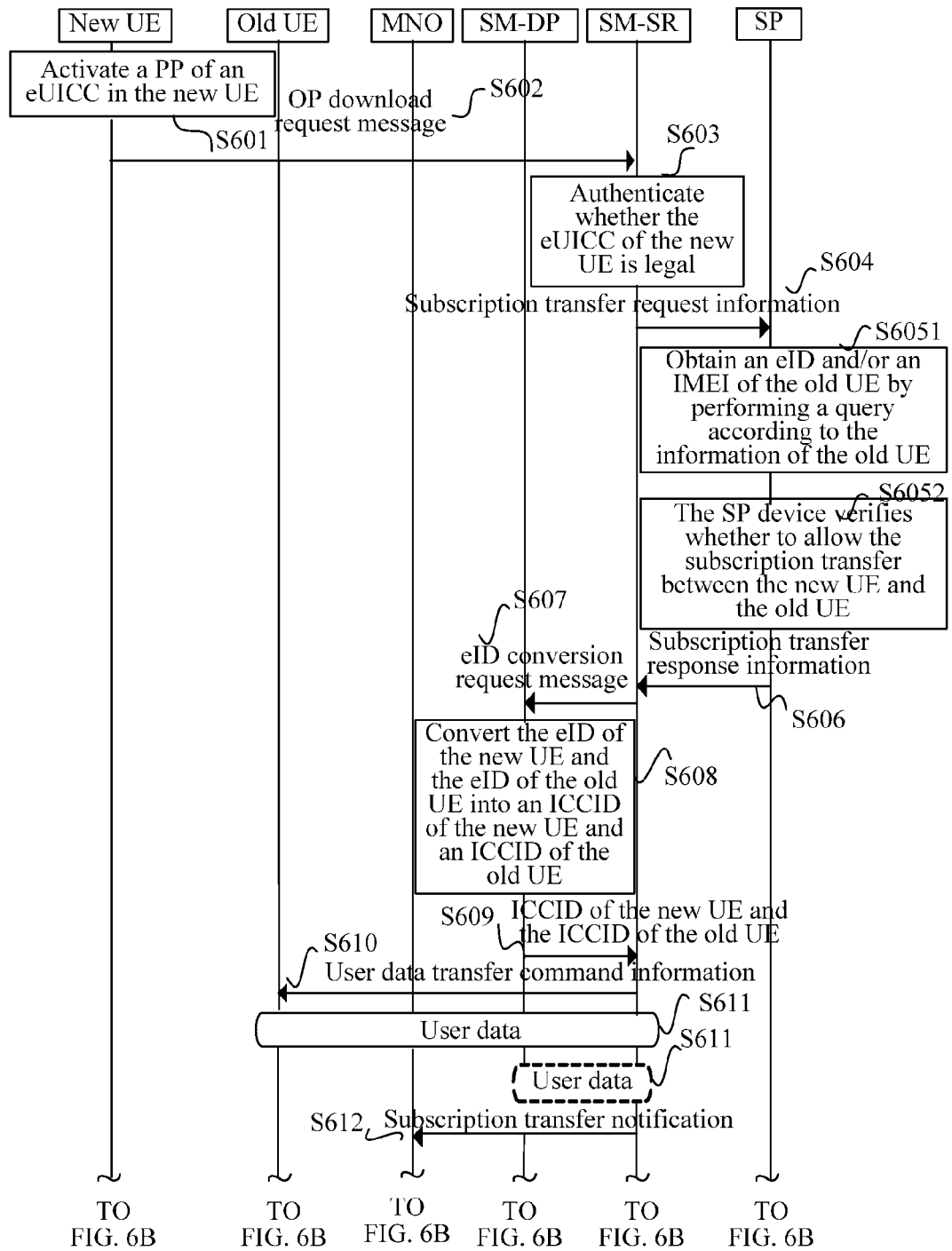
FIG. 6A and FIG. 6B are a flowchart of Embodiment 6 of a subscription transfer method according to the present invention.
Figure 6B:
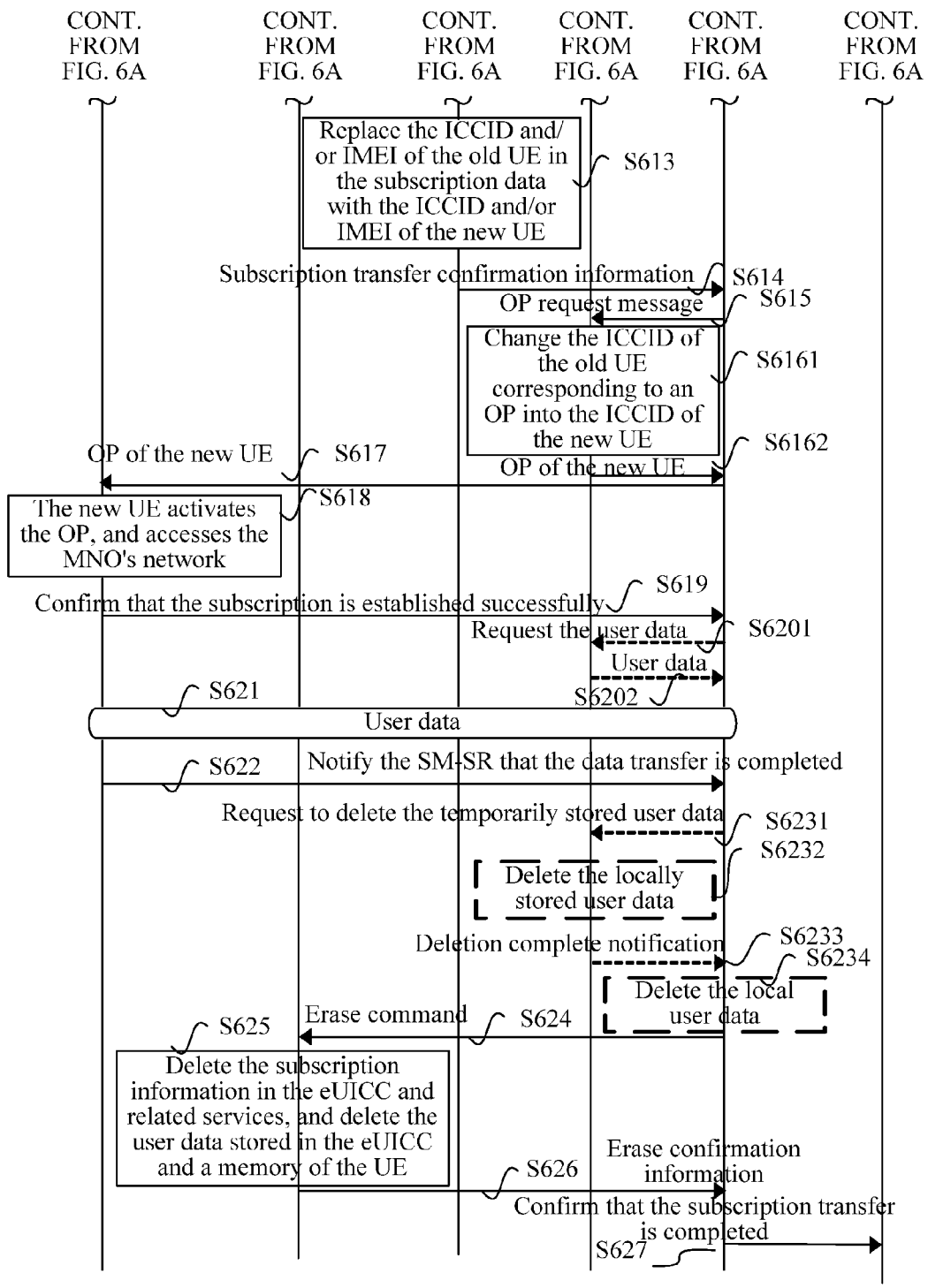

FIG. 6A and FIG. 6B are a flowchart of Embodiment 6 of a subscription transfer method according to the present invention. As shown in FIG. 6A and FIG. 6B, the subscription transfer method provided by the present invention is described in detail in this embodiment by using an example in which a first UE initiates subscription transfer, both the first UE and a second UE may access a network, the first UE is a new UE (that is, the first UE is a target UE to which an eUICC subscription is transferred), the second UE is an old UE (that is, the second UE is a source UE from which the eUICC subscription is transferred), and SP authentication is performed. The method may include the following steps.

S601. A user activates a provisioning profile (PP) of an eUICC in a new UE.

Activating the PP of the eUICC in the new UE may ensure that communication can be performed between the new UE and an SM-SR module.

S602. The new UE sends an OP download request message to an SM-SR module.

The request message may carry an eID and/or an IMEI of the new UE, information of an old UE, an SP device address, and a subscription transfer indication. The information of the old UE may include identity information assigned to the user by an SP device and identity information of the old UE, which are used to perform dual authentication on the old UE and prevent other people from illegally transferring a subscription of the old UE. The eID may be a unique identity of the eUICC.

The new UE and old UE may be UEs using the eUICC, for example, mobile phones, tablet personal computers, personal digital assistants, and electricity meters. The new UE may be a UE that needs to acquire the subscription, and the old UE may be a UE that transfers the subscription.

S603. The SM-SR module authenticates whether the eUICC of the new UE is legal.

For example, an eUICC certificate may be used to perform authentication.

S604. If the eUICC of the new UE passes the authentication in S603, the SM-SR module sends subscription transfer request message to an SP device, where the subscription transfer request information carries an eID and/or an IMEI of the new UE and information of the old UE.

S6051. The SP device obtains an eID and/or an IMEI of the old UE by performing a query according to the information of the old UE.

S6052. The SP device verifies whether to allow the subscription transfer between the new UE and the old UE.

For example, a binding relationship may exist between the subscription and a brand and model of a UE. If the first UE, that is, the target UE to which the subscription is transferred, does not meet requirements of the subscription on the brand and model of the UE, it is possible that transfer of the subscription to the first UE is not allowed.

S606. The SP device sends a subscription transfer response message to the SM-SR module.

The subscription transfer response information carries an indication indicating whether the subscription transfer is allowed. If the subscription transfer is allowed, the subscription transfer response information further carries the eID and/or IMEI of the old UE.

S604 to S606 are steps where the SP device performs authentication on the new UE and old UE before the subscription transfer to verify whether the subscription transfer is allowed.

S607. The SM-SR module sends an eID conversion request message to an SM-DP module, where the eID conversion request message carries the eID of the new UE and the eID of the old UE.

S608. The SM-DP module converts the eID of the new UE and the eID of the old UE into an ICCID of the new UE and an ICCID of the old UE.

The eID is a globally unique identity of the eUICC. The ICCID is an integrated circuit card identity including a specific MNO code. Therefore, after the SM-DP module converts the eID into the ICCID, it is convenient for an MNO network to use the ICCID corresponding to the MNO network to recognize the corresponding eUICC.

S609. The SM-DP module sends the ICCID of the new UE and the ICCID of the old UE to the SM-SR module.

S610. The SM-SR module sends user data transfer command message to the old UE, where the user data transfer command information carries a subscription transfer indication.

The subscription transfer indication carried in the data transfer command information is used to indicate data transfer initiated to perform the subscription transfer.

S611. The old UE sends user data stored in the eUICC and user data stored in a specific storage unit in the UE to the SM-SR module for temporary storage, or the data is stored to a temporary storage unit of the SM-DP module through the SM-SR module.

The temporarily stored user data may be indexed by using the ICCID of the old UE. The user data includes personal data (for example, an address book and electricity meter readings), applications, and so on. If the user data can be carried in a signaling message, the user data may be carried in a data transfer response message. Otherwise, if the amount of data is large or a data format does not allow transfer in signaling, the old UE may request to create a data bearer to transfer the user data.

S612. The SM-SR module sends a subscription transfer notification to a device in an MNO network, notifying the device in the MNO network that the subscription of the old UE will be transferred to the new UE, where the subscription transfer notification carries the ICCID and/or IMEI of the new UE, the ICCID and/or IMEI of the old UE, and a subscription transfer indication.

Another possible implementation manner of S612 may be as follows. The SM-SR module first sends a subscription transfer notification message to the SM-DP, where the subscription transfer notification message carries the eID and/or IMEI of the new UE, the eID and/or IMEI of the old UE, and a subscription transfer indication; upon reception of the subscription transfer notification message, the SM-DP module converts the received eID of the new UE and eID of the old UE into the ICCID of the new UE and the ICCID of the old UE; and then the SM-DP module sends a subscription transfer notification message to the device in the MNO network, where the subscription transfer notification message carries the ICCID and/or IMEI of the new UE, the ICCID and/or IMEI of the old UE, and the subscription transfer indication. S608 is not required in this implementation manner.

S613. If subscription data in the MNO network includes an ICCID and/or an IMEI, the device in the MNO network replaces the ICCID and/or IMEI of the old UE in the subscription data with the ICCID and/or IMEI of the new UE.

Replacing the ICCID and/or IMEI in the subscription data in the device in the MNO network may ensure that after the subscription transfer, the MNO network can recognize the new UE and provide services for the new UE.

It is understandable that in a case in which the subscription data in the MNO network does not include the ICCID and/or IMEI of the old UE, the device in the MNO network does not need to replace the ICCID and/or IMEI of the UE.

S614. The device in the MNO network feeds back a subscription transfer confirmation message to the SM-SR module.

Another possible implementation manner of S614 may be as follows. The device in the MNO network first sends subscription transfer acknowledgement information that carries the ICCID of the new UE and the ICCID of the old UE to the SM-DP module; upon reception of the subscription transfer acknowledgement information, the SM-DP module converts the received ICCID of the new UE and ICCID of the old UE into the eID of the new UE and the eID of the old UE; and then the SM-DP module sends subscription transfer acknowledgement information that carries the eID of the new UE and the eID of the old UE to the SM-SR module.

S615. The SM-SR module sends an OP request message to the SM-DP module, where the message includes the ICCID of the new UE and the ICCID of the old UE.

S6161. The SM-DP module changes the ICCID of the old UE corresponding to an OP into the ICCID of the new UE.

S6162. The SM-DP module sends the OP of the new UE to the SM-SR module.

S617. The SM-SR module sends the OP of the new UE to the new UE.

The UE may access the operator network by using the OP. Therefore, the SM-DP module changes the ICCID of the old UE corresponding to the OP into the ICCID of the new UE, and sends the OP of the new UE to the SM-SR module. Therefore, the new UE can obtain the OP in the subscription transfer process.

S618. The new UE activates the OP, and accesses the MNO network.

S619. The new UE confirms with the SM-SR module that the subscription is established successfully.

S6201. If the user data is stored in the SM-DP module in S611, the SM-SR module requests the user data from the SM-DP module.

S6202. The SM-DP module sends the user data to the SM-SR module.

S621. The SM-SR module sends the user data to the new UE.

The user data may be carried in signaling, or the UE may also be requested to create a data bearer for transfer.

S622. After the user data transfer is complete, the new UE sends a message to the SM-SR module, notifying the SM-SR module that the data transfer is complete.

S6231. If the user data is temporarily stored in the SM-DP module, the SM-SR module requests the SM-DP module to delete the temporarily stored user data.

S6232. The SM-DP module deletes the locally stored user data.

S6233. The SM-DP module notifies the SM-SR module after the locally stored user data is deleted.

S6234. If the user data is temporarily stored in the SM-SR module, the SM-SR module deletes the local user data.

S624. The SM-SR module sends a deletion command to the old UE.

S625. The old UE deletes the subscription data in the eUICC and related services, and deletes the user data stored in the eUICC and a memory of the UE.

Further, optionally, the user may selectively delete the user data in the eUICC and a memory of the UE.

S626. The old UE sends deletion acknowledgment information to the SM-SR module.

S627. The SM-SR module confirms with the SP device that the subscription transfer is complete.

In the subscription transfer method provided by this embodiment, a subscription transfer request message sent by a new UE is received; authentication is performed by an SP device, and user data in an old UE is transferred to the new UE; and then a device in an MNO network replaces identity information of the old UE in subscription data with identity information of the new UE, and an SM-DP module replaces the identity information of the old UE corresponding to an OP with the identity information of the new UE; then the OP is sent to the new UE. Thereby, secure legal transfer of an eUICC subscription between UEs that use an eUICC can be implemented, and it is more flexible and convenient for a user to change a UE.

A subscription transfer method provided by the present invention is described in detail in Embodiment 7 by using an example in which a second UE initiates subscription transfer, both a first UE and the second UE may access a network, the first UE is a new UE, the second UE is an old UE, and authentication is performed by an SP device. The method may include the following steps.

Step 1: An old UE sends a subscription transfer request message to an SM-SR module, where the message includes an eID and/or an IMEI of the old UE, information of a new UE, an SP device address, and a subscription transfer indication.

Step 2: The SM-SR module sends a subscription transfer request message to an SP device, where the subscription transfer request information carries the eID and/or IMEI of the old UE and the information of the new UE.

Step 3: The SP device obtains the eID and/or IMEI of the old UE by performing a query according to the information of the new UE, and verifies whether to allow subscription transfer between the new UE and the old UE.

Step 4: The SP device sends subscription transfer response information to the SM-SR module.

The subscription transfer response information carries an indication indicating whether the subscription transfer is allowed. If the subscription transfer is allowed, the subscription transfer response information further carries the eID and/or IMEI of the new UE.

Step 5 to step 12 are similar to S607-S614 in the embodiment shown in FIG. 6A and FIG. 6B, and are not further described.

Step 13: The SM-SR module sends a request for activating the new UE to the old UE.

Step 14: APP of the new UE is activated.

Step 15: The new UE sends an OP download request to the SM-SR module.

Step 16: The SM-SR module authenticates whether an eUICC of the new UE is legal.

Step 17 to step 29 are similar to S615-S627 in the embodiment shown in FIG. 6A and FIG. 6B, and are not further described.

In the subscription transfer method provided by this embodiment, a subscription transfer request message sent by an old UE is received; authentication is performed by an SP device, and user data in the old UE is transferred to a new UE; then a device in an MNO network replaces identity information of the old UE in subscription data with identity information of the new UE, and an SM-DP module replaces the identity information of the old UE corresponding to an OP with the identity information of the new UE; and then the OP is sent to the new UE. Thereby, transfer of an eUICC subscription between UEs that use an eUICC can be implemented, and it is more flexible and convenient for a user to change a UE.

Figure 7A:
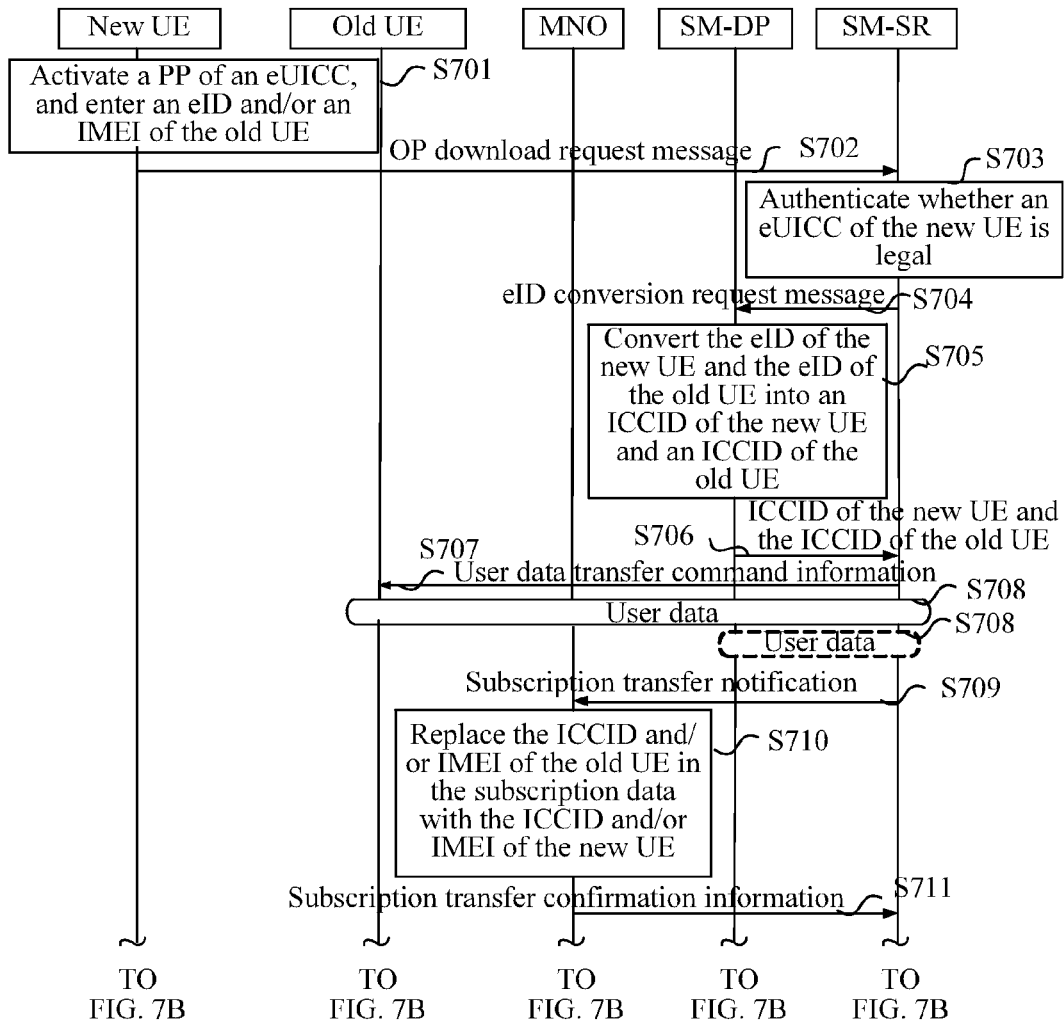
FIG. 7A and FIG. 7B are a flowchart of Embodiment 8 of a subscription transfer method according to the present invention.
Figure 7B:
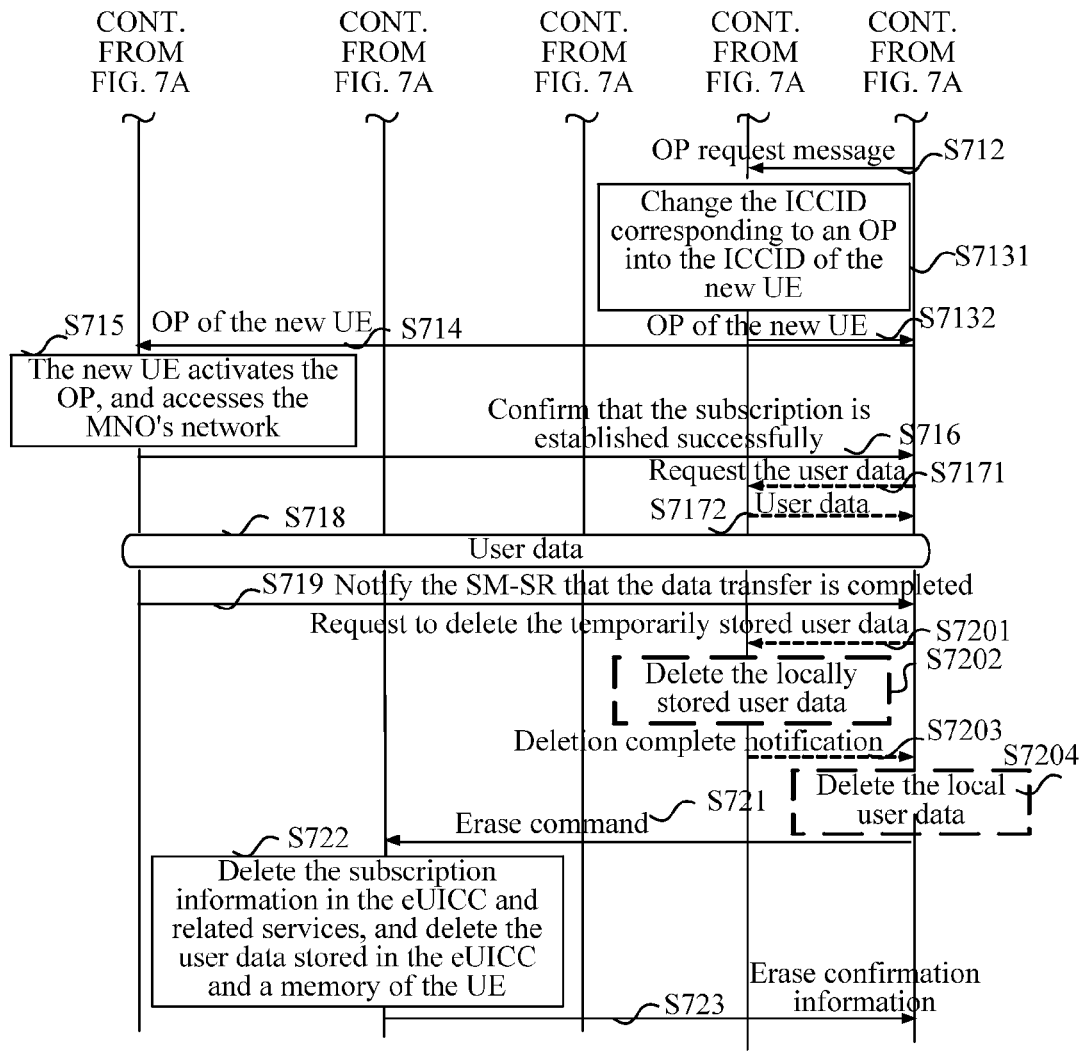

FIG. 7A and FIG. 7B are a flowchart of Embodiment 8 of a subscription transfer method according to the present invention. As shown in FIG. 7A and FIG. 7B, the subscription transfer method provided by the present invention is described in detail in this embodiment by using an example in which a first UE initiates subscription transfer, both the first UE and a second UE may access a network, the first UE is a new UE, the second UE is an old UE, and authentication is not performed by an SP device. The method may include the following steps.

S701. A user or an SP employee activates a PP of a new UE, and enters an eID and/or an IMEI of an old UE.

S702. The new UE sends an OP download request to an SM-SR module, where the request message includes an eID and/or an IMEI of the new UE, the eID and/or IMEI of the old UE, and a subscription transfer indication.

S703. The SM-SR module authenticates whether an eUICC of the new UE is legal.

S704-S723 are similar to S607-S626 in the embodiment shown in FIG. 6A and FIG. 6B, and are not further described.

In the subscription transfer method provided by this embodiment, a subscription transfer request message sent by a new UE is received, and user data in an old UE is transferred to the new UE; then a device in an MNO network replaces identity information of the old UE in subscription data with identity information of the new UE, and an SM-DP module replaces the identity information of the old UE corresponding to an OP with the identity information of the new UE; and then the OP is sent to the new UE. Thereby, transfer of an eUICC subscription between UEs that use an eUICC can be implemented, and it is more flexible and convenient for a user to change a UE.

A subscription transfer method provided by the present invention is described in detail in Embodiment 9 by using an example in which a second UE initiates subscription transfer, both a first UE and the second UE may access a network, the first UE is a new UE, the second UE is an old UE, and authentication is not performed by an SP device. The method may include the following steps.

Step 1: A user or an SP employee enters an eID and an IMEI of a new UE in an old terminal.

Step 2: The old terminal sends a subscription transfer request message to an SM-SR module, where the request message includes the eID and IMEI of the new terminal, an eID and an IMEI of the old terminal, and a subscription transfer indication.

Step 3 to step 21 are similar to S704-723 in the embodiment shown in FIG. 7A and FIG. 7B, and are not further described.

In the subscription transfer method provided by this embodiment, a subscription transfer request message sent by an old UE is received, and user data in the old UE is transferred to a new UE; then a device in an MNO network replaces identity information of the old UE in subscription data with identity information of the new UE, and an SM-DP module replaces the identity information of the old UE corresponding to an OP with the identity information of the new UE; and then the OP is sent to the new UE. Thereby, transfer of an eUICC subscription between UEs that use an eUICC can be implemented, and it is more flexible and convenient for a user to change a UE.

Figure 8:
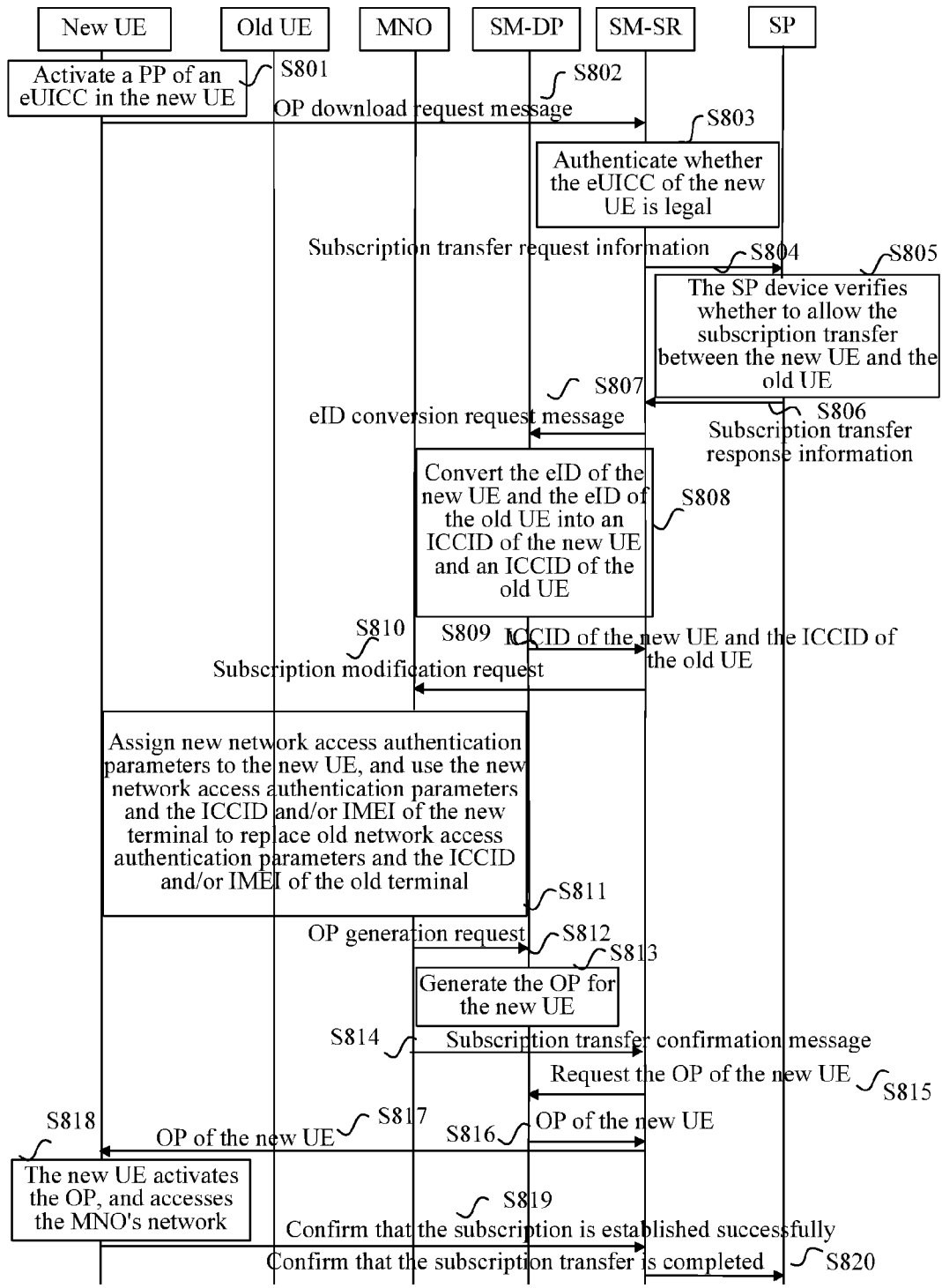
FIG. 8 is a flowchart of Embodiment 10 of a subscription transfer method according to the present invention.

FIG. 8 is a flowchart of Embodiment 10 of a subscription transfer method according to the present invention. As shown in FIG. 8, the subscription transfer method provided by the present invention is described in detail in this embodiment by using an example in which a second UE is lost, a first UE initiates subscription transfer, the first UE is a new UE, the second UE is an old UE, and authentication is performed by an SP device. The method may include the following steps.

S801-S809 are the same as S601-S604, S6052, and S606-S609 in the embodiment shown in FIG. 6A and FIG. 6B, and are not further described.

S810. The SM-SR module sends a subscription modification request message to a device in an MNO network, where the request message includes the ICCID and/or IMEI of the new UE, the ICCID and/or IMEI of the old UE, and a subscription transfer indication indicating subscription transfer in a case in which the old UE is lost.

Another possible implementation manner of S810 may be as follows. The SM-SR module first sends a subscription transfer notification message to the SM-DP module, where the subscription transfer notification message carries the eID and/or IMEI of the first UE, the eID and/or IMEI of the second UE, and a subscription transfer indication; upon reception of the subscription transfer notification message, the SM-DP converts the received eID of the first UE and eID of the second UE into the ICCID of the first UE and the ICCID of the second UE; and then the SM-DP module sends a subscription transfer notification message to the device in the MNO network, where the subscription transfer notification message carries the ICCID and/or IMEI of the first UE, the ICCID and/or IMEI of the second UE, and the subscription transfer indication.

S811. The device in the MNO network assigns new network access authentication parameters such as an IMSI and K to the new UE, and uses the new network access authentication parameters and the ICCID and/or IMEI of the new UE to replace network access authentication parameters corresponding to the old UE and the ICCID and/or IMEI of the old UE in the MNO network.

It is understandable that in a case in which the subscription data in the MNO network does not include the ICCID and/or IMEI of the second UE, the device in the MNO network does not need to replace the identity information of the UE, that is, the ICCID and/or IMEI of the UE.

S812. The device in the MNO network requests the SM-DP to generate an OP for the new UE, where the network access authentication parameters assigned to the new UE by the device in the MNO network and the ICCID of the new UE are carried in the request message.

S813. The SM-DP generates an OP for the new UE.

S814. The device in the MNO network sends a subscription transfer acknowledgement message to the SM-SR module.

S815. The SM-SR module requests the SM-DP to provide the OP of the new UE, where the ICCID of the new UE is carried in the request message.

S816. The SM-DP sends the OP of the new UE to the SM-SR module.

S817-S820 are the same as S617-S619 and S627 in the embodiment shown in FIG. 6A and FIG. 6B.

In the subscription transfer method provided by this embodiment, a subscription transfer request message sent by a new UE is received; authentication is performed by an SP device; then a subscription modification request message is sent to a device in an MNO network, so that the device in the MNO network assigns new network access authentication parameters to the new UE, and uses the new network access authentication parameters and identity information of the new UE to replace old network access authentication parameters and identity information of an old UE; and the device in the MNO's network requests an SM-DP module to generate a new OP for the new UE, and sends the generated OP to the new UE. Thereby, secure legal transfer of an eUICC subscription between UEs that use an eUICC can be implemented, and it is more flexible and convenient for a user to change a UE.

A subscription transfer method provided by the present invention is described in detail in Embodiment 11 by using an example in which a second UE is lost, a first UE initiates subscription transfer, the first UE is a new UE, the second UE is an old UE, and authentication is not performed by an SP device. The method may include the following steps:

Step 1: A user or an SP employee activates a PP of a new UE, and enters an ICCID and an IMEI of an old UE.

Step 2: The new UE sends an OP download request to an SM-SR module, where the request message includes an ICCID and/or an IMEI of the new UE, the ICCID and/or IMEI of the old UE, and a subscription transfer indication.

Step 3: The SM-SR module authenticates whether an eUICC of the new UE is legal.

Step 4 to step 13 are the same as S810-S819 in the embodiment shown in FIG. 8.

In the subscription transfer method provided by this embodiment, a subscription transfer request message sent by a new UE is received; then a subscription modification request message is sent to a device in an MNO network, so that the device in the MNO network assigns new network access authentication parameters to the new UE, and uses the new network access authentication parameters and identity information of the new UE to replace old network access authentication parameters and identity information of an old UE; and the device in the MNO's network requests an SM-DP module to generate a new OP for the new UE, and sends the generated OP to the new UE. Thereby, transfer of an eUICC subscription between UEs that use an eUICC can be implemented, and it is more flexible and convenient for a user to change a UE.

Figure 9:
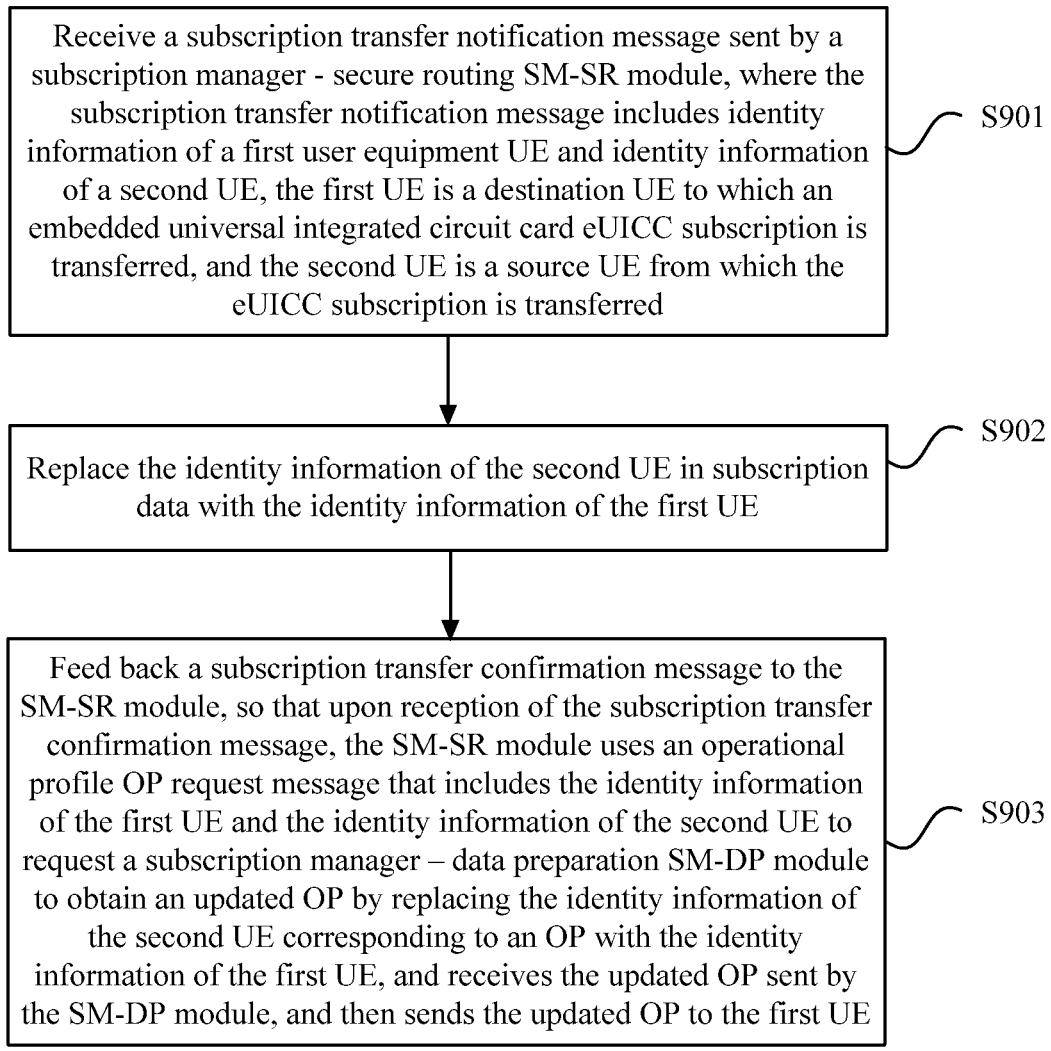
FIG. 9 is a flowchart of Embodiment 12 of a subscription transfer method according to the present invention.

FIG. 9 is a flowchart of Embodiment 12 of a subscription transfer method according to the present invention. As shown in FIG. 9, the subscription transfer method in this embodiment includes the following steps.

S901. Receive a subscription transfer notification message sent by an SM-SR module, where the subscription transfer notification message includes identity information of a first UE and identity information of a second UE, where the first UE is a target UE to which an eUICC subscription is transferred, and the second UE is a source UE from which the eUICC subscription is transferred.

S902. Replace the identity information of the second UE in subscription data with the identity information of the first UE.

S903. Feed back a subscription transfer acknowledgement message to the SM-SR module, so that upon reception of the subscription transfer acknowledgement message, the SM-SR module uses an OP request message that includes the identity information of the first UE and the identity information of the second UE to request an SM-DP module to replace the identity information of the second UE corresponding to an OP with the identity information of the first UE to obtain an updated OP, and receives the updated OP sent by the SM-DP module, and then sends the updated OP to the first UE.

An entity executing the foregoing steps may be a device in an MNO network.

In the subscription transfer method provided by this embodiment, a device in an MNO network receives a subscription transfer notification message sent by an SM-SR module, replaces identity information of a second UE in subscription data with identity information of a first UE, and then feeds back a subscription transfer acknowledgement message to the SM-SR module, so that upon reception of the subscription transfer acknowledgement message, the SM-SR module uses an OP request message that includes the identity information of the first UE and the identity information of the second UE to request an SM-DP module to replace the identity information of the second UE corresponding to an OP with the identity information of the first UE to obtain an updated OP, and receives the updated OP sent by the SM-DP module, and then sends the updated OP to the first UE. Thereby, transfer of an eUICC subscription between UEs that use an eUICC can be implemented, and it is more flexible and convenient for a user to change a UE.

Figure 10:
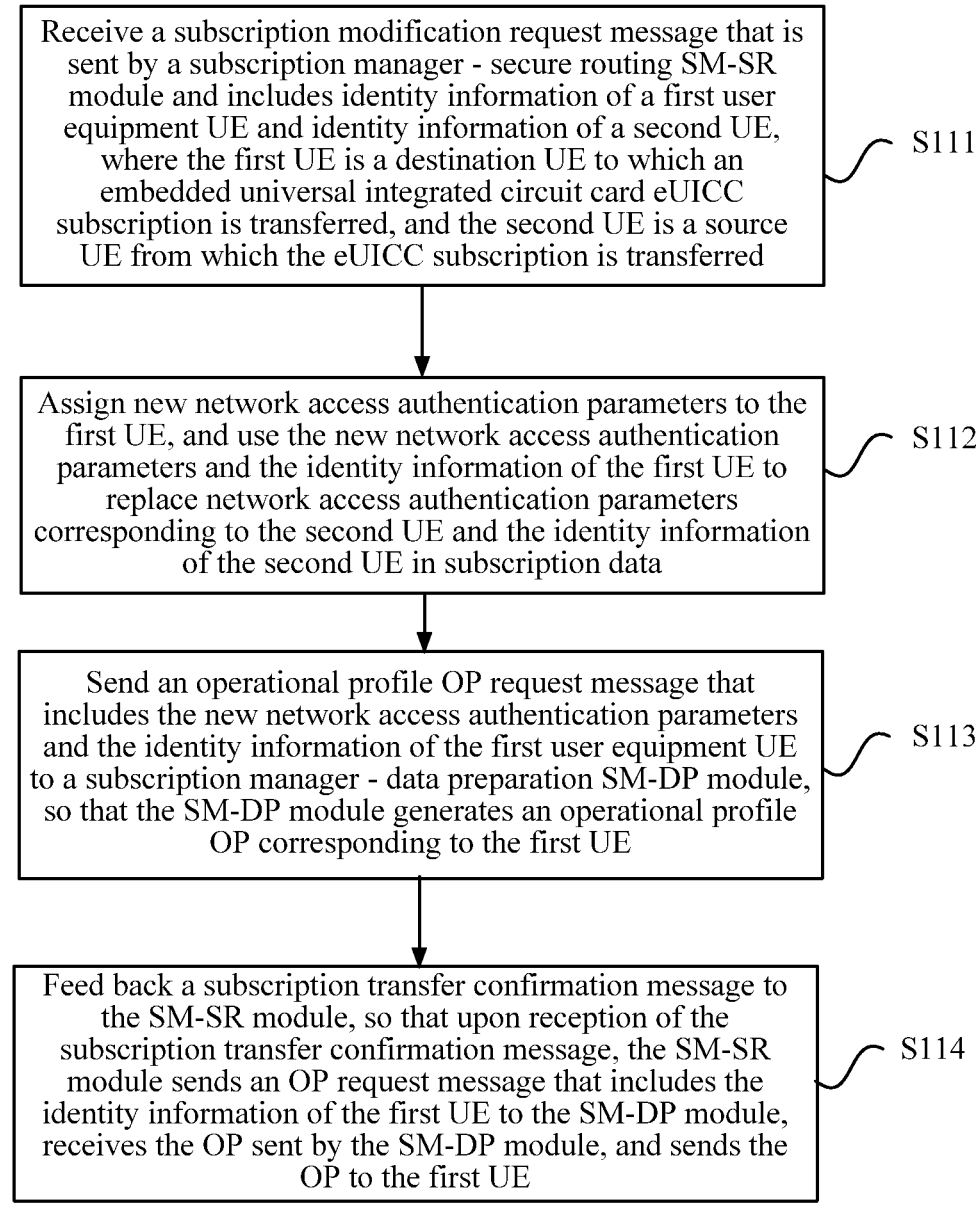
FIG. 10 is a flowchart of Embodiment 13 of a subscription transfer method according to the present invention.

FIG. 10 is a flowchart of Embodiment 13 of a subscription transfer method according to the present invention. As shown in FIG. 10, the subscription transfer method in this embodiment includes the following steps.

S111. Receive a subscription modification request message that is sent by an SM-SR module and includes identity information of a first UE and identity information of a second UE, where the first UE is a target UE to which an eUICC subscription is transferred, and the second UE is a source UE from which the eUICC subscription is transferred.

S112. Assign new network access authentication parameters to the first UE, and use the new network access authentication parameters and the identity information of the first UE to replace network access authentication parameters corresponding to the second UE and the identity information of the second UE in subscription data.

S113. Send an OP request message that includes the new network access authentication parameters and the identity information of the first UE to an SM-DP module, so that the SM-DP module generates an OP corresponding to the first UE.

S114. Feed back a subscription transfer acknowledgement message to the SM-SR module, so that upon reception of the subscription transfer acknowledgement message, the SM-SR module sends an OP request message that includes the identity information of the first UE to the SM-DP module, receives the OP sent by the SM-DP module, and sends the OP to the first UE.

An entity executing the foregoing steps may be a device in an MNO network.

In the subscription transfer method provided by this embodiment, after receiving a subscription modification request message that is sent by an SM-SR module, a device in an MNO network assigns new network access authentication parameters to a first UE, uses the new network access authentication parameters and the identity information of the first UE to replace network access authentication parameters corresponding to a second UE and identity information of the second UE in subscription data, sends an OP request message to an SM-DP module, so that the SM-DP module generates an OP corresponding to the first UE, and then feeds back a subscription transfer acknowledgement message to the SM-SR module, so that upon reception of the subscription transfer acknowledgement message, the SM-SR module sends an OP request message that includes the identity information of the first UE to the SM-DP module, receives the OP sent by the SM-DP module, and sends the OP to the first UE. Thereby, transfer of an eUICC subscription between UEs that use an eUICC can be implemented, and it is more flexible and convenient for a user to change a UE.

Figure 11:
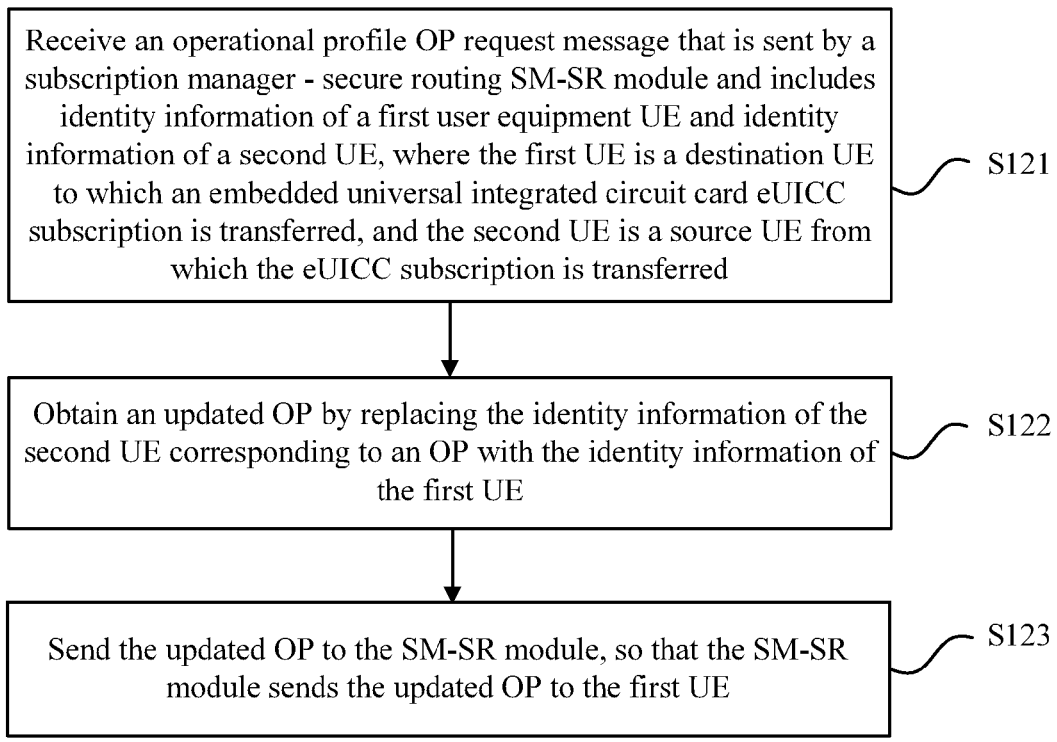
FIG. 11 is a flowchart of Embodiment 14 of a subscription transfer method according to the present invention.

FIG. 11 is a flowchart of Embodiment 14 of a subscription transfer method according to the present invention. As shown in FIG. 11, the subscription transfer method in this embodiment includes the following steps.

S121. Receive an OP request message that is sent by an SM-SR module and includes identity information of a first UE and identity information of a second UE, where the first UE is a target UE to which an eUICC subscription is transferred, and the second UE is a source UE from which the eUICC subscription is transferred.

S122. Replace the identity information of the second UE corresponding to an OP with the identity information of the first UE to obtain an updated OP.

S123. Send the updated OP to the SM-SR module, so that the SM-SR module sends the updated OP to the first UE.

An entity executing the foregoing steps may be an SM-DP module.

In the subscription transfer method provided by this embodiment, an SM-DP module receives an OP request message that is sent by an SM-SR module, replaces identity information of a second UE corresponding to an OP with identity information of a first UE to obtain an updated OP, and then sends the updated OP to the SM-SR module, so that the SM-SR module sends the updated OP to the first UE. Thereby, transfer of an eUICC subscription between UEs that use an eUICC can be implemented, and it is more flexible and convenient for a user to change a UE.

Figure 12:
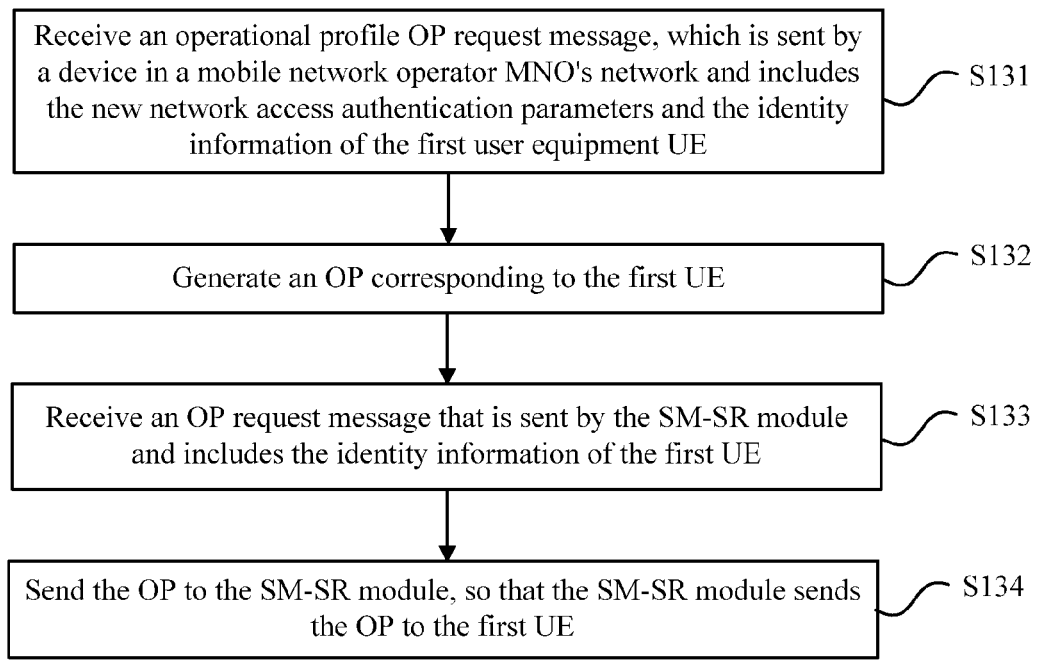
FIG. 12 is a flowchart of Embodiment 15 of a subscription transfer method according to the present invention.

FIG. 12 is a flowchart of Embodiment 15 of a subscription transfer method according to the present invention. As shown in FIG. 12, the subscription transfer method in this embodiment includes the following steps.

S131. Receive an OP request message, which is sent by a device in an MNO network after network access authentication parameters corresponding to a second UE and identity information of the second UE in subscription data are replaced with new network access authentication parameters and identity information of a first UE and which includes the new network access authentication parameters and the identity information of the first UE, where the new network access authentication parameters are network access authentication parameters assigned to the first UE after the device in the MNO network receives a subscription modification request message that is sent by an SM-SR module and that includes the identity information of the first UE and the identity information of the second UE, the first UE is a target UE to which an eUICC subscription is transferred, and the second UE is a source UE from which the eUICC subscription is transferred.

S132. Generate, according to the new network access authentication parameters and the identity information of the first UE, an OP corresponding to the first UE.

S133. Receive an OP request message that is sent by the SM-SR module and includes the identity information of the first UE.

S134. Send the OP corresponding to the first UE to the SM-SR module, so that the SM-SR module sends the OP to the first UE.

An entity executing the foregoing steps may be an SM-DP module.

In the subscription transfer method provided by this embodiment, an SM-DP module receives an OP request message, which is sent by a device in an MNO network after network access authentication parameters corresponding to a second UE and identity information of the second UE in subscription data are replaced with new network access authentication parameters and identity information of a first UE, generates, according to the new network access authentication parameters and the identity information of the first UE, an OP corresponding to the first UE, and then sends the OP corresponding to the first UE to an SM-SR module, so that the SM-SR module sends the OP to the first UE. Thereby, transfer of an eUICC subscription between UEs that use an eUICC can be implemented, and it is more flexible and convenient for a user to change a UE.

Figure 13:
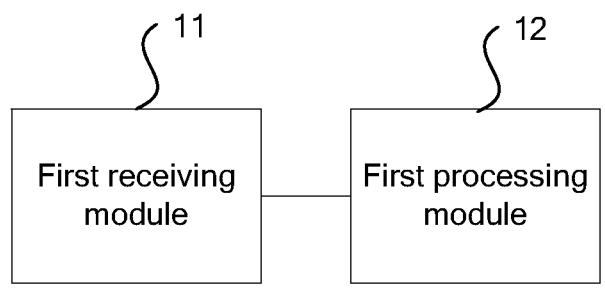
FIG. 13 is a schematic structural diagram of Embodiment 1 of an SM-SR module according to the present invention.

FIG. 13 is a schematic structural diagram of Embodiment 1 of an SM-SR module according to the present invention, according to the present invention. As shown in FIG. 13, the subscription transfer apparatus in this embodiment includes a first receiving module 11 and a first processing module 12, where the first receiving module 11 is configured to receive a subscription transfer request message sent by a first UE or a second UE, where the first UE is a target UE to which an eUICC subscription is transferred, and the second UE is a source UE from which the eUICC subscription is transferred; and the first processing module 12 is configured to transfer the eUICC subscription from the second UE to the first UE according to the subscription transfer request message, so that the first UE accesses an operator network according to transferred eUICC subscription data.

The SM-SR module in this embodiment may be configured to execute the technical solution of the method embodiment shown in FIG. 1. The implementation principle and technical effect thereof are similar, and are not further described herein.

Figure 14:
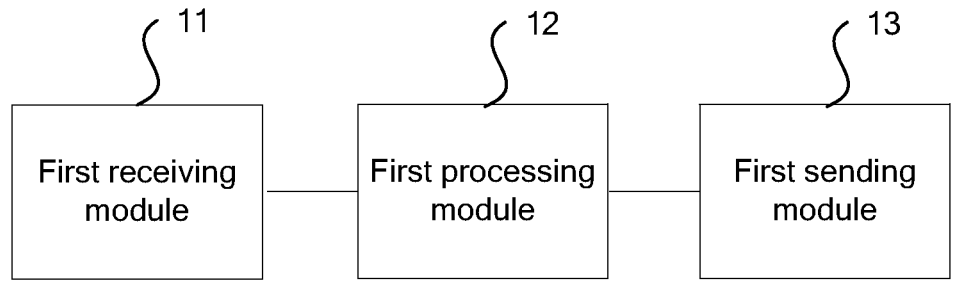
FIG. 14 is a schematic structural diagram of Embodiment 2 of an SM-SR module according to the present invention.

FIG. 14 is a schematic structural diagram of Embodiment 2 of an SM-SR module according to the present invention. As shown in FIG. 14, the SM-SR module in this embodiment, on a basis of the embodiment shown in FIG. 13, may further include a first sending module 13, where the first sending module 13 is configured to, before the first processing module transfers the eUICC subscription from the second UE to the first UE, send an authentication request message to an SP device, so that the SP device determines whether to allow the eUICC subscription transfer; where the first receiving module 11 is further configured to receive an authentication response message sent by the SP device.

The SM-SR module in this embodiment may be configured to execute the technical solution of the method embodiment shown in FIG. 2. The implementation principle and technical effect thereof are similar, and are not further described herein.

In Embodiment 3 of an SM-SR module provided by the present invention, the first sending module 13 is further configured to send a data transfer command message to the second UE before the first processing module transfers the eUICC subscription from the second UE to the first UE; and the first receiving module 11 is further configured to receive user data that is sent by the second UE according to the data transfer command message, where the user data includes user data stored in an eUICC of the second UE and/or user data stored in a storage unit of the second UE.

After receiving the user data that is sent by the second UE according to the data transfer command message, the SM-SR module in this embodiment may locally store the user data, or may send the user data to an SM-DP module, so that the SM-DP module stores the user data.

The first sending module 13 may be further configured to send the user data to the first UE.

Further, optionally, after the user data is sent to the first UE, if the user data is stored in the SM-SR module in this embodiment, the SM-SR module deletes the locally stored user data; and if the user data is stored in the SM-DP module, the first sending module 13 may be further configured to send a deletion notification message to the SM-DP module, so that the SM-DP module deletes the stored user data.

Further, the first sending module 13 may be configured to send a data deletion command to the second UE, so that the second UE deletes the subscription data stored in the eUICC.

It is understandable that a user may selectively delete the user data stored in the eUICC of the second UE and/or the user data stored in the storage unit of the second UE.

The SM-SR module in this embodiment may be configured to execute the technical solution of the method embodiment shown in FIG. 3. The implementation principle and technical effect thereof are similar, and are not further described herein.

Embodiment 4 of a SM-SR module according to the present invention: on a basis of the embodiment shown in FIG. 13, in the SM-SR module in this embodiment, the first processing module 12 may be configured to send a subscription transfer notification message to a device in an MNO network, where the subscription transfer notification message includes identity information of the first UE and identity information of the second UE, so that the device in the MNO network replaces the identity information of the second UE in the subscription data with the identity information of the first UE; receive a subscription transfer acknowledgement message fed back by the device in the MNO network; send an OP request message that includes the identity information of the first UE and the identity information of the second UE to an SM-DP module, so that the SM-DP module replaces the identity information of the second UE corresponding to an OP with the identity information of the first UE to obtain an updated OP; and receive the updated OP sent by the SM-DP module, and send the updated OP to the first UE.

The SM-SR module of this embodiment may be configured to execute the technical solution of the method embodiment shown in FIG. 4. The implementation principle and technical effect thereof are similar, and are not further described herein.

Embodiment 5 of an SM-SR module according to the present invention: on a basis of the embodiment shown in FIG. 13, in the SM-SR module in this embodiment, the first processing module 12 may be configured to send a subscription modification request message that includes identity information of the first UE and identity information of the second UE to a device in an MNO network, so that the device in the MNO network assigns new network access authentication parameters to the first UE, uses the new network access authentication parameters and the identity information of the first UE to replace network access authentication parameters corresponding to the second UE and the identity information of the second UE in the subscription data, and uses the new network access authentication parameters and the identity information of the first UE to request an SM-DP module to generate an OP corresponding to the first UE; receive a subscription transfer acknowledgement message fed back by the device in the MNO network; send an OP request message that includes the identity information of the first UE to the SM-DP module; and receive an OP sent by the SM-DP module, and send the OP to the first UE.

The SM-SR module in this embodiment may be configured to execute the technical solution of the method embodiment shown in FIG. 5. The implementation principle and technical effect thereof are similar, and are not further described herein.

Figure 15:
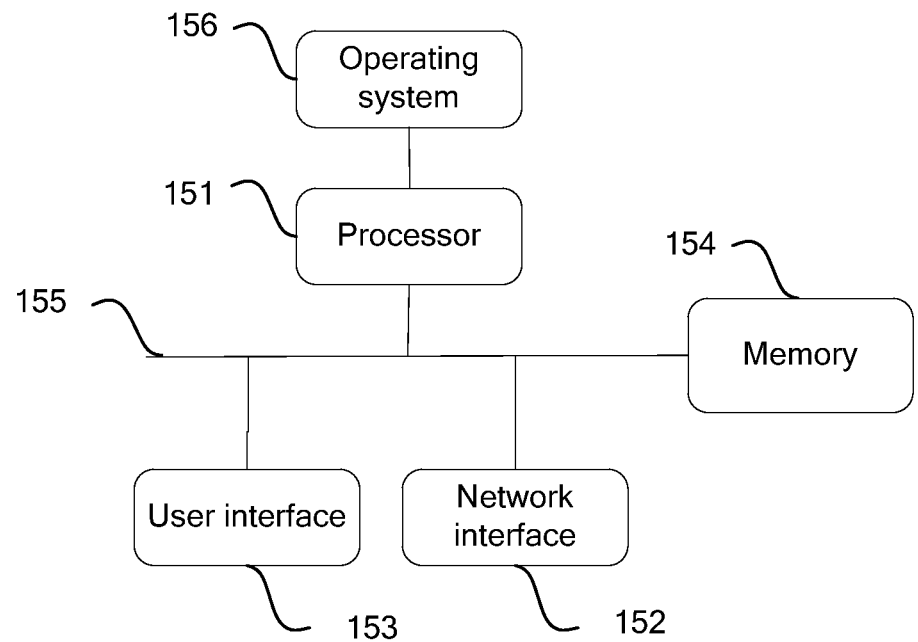
FIG. 15 is a schematic structural diagram of Embodiment 6 of an SM-SR module according to the present invention.

FIG. 15 is a schematic structural diagram of Embodiment 6 of an SM-SR module according to the present invention. As shown in FIG. 15, the SM-SR module in this embodiment includes at least one processor 151, for example, a central processing unit (CPU), a least one of a network interface 152 and another user interface 153, a memory 154, at least one communications bus 155, and an operating system 156. The communications bus 155 is configured to implement communication between the components. The memory 154 may include a high-speed random-access memory (RAM) memory, or may further include a non-volatile memory, for example, at least one disk storage. The memory 154 may optionally include at least one storage device far from the processor 151. The operating system 156 includes various programs, and is configured to implement various basic services and process hardware-based tasks.

The network interface 152 is configured to receive a subscription transfer request message sent by a first UE or a second UE, where the first UE is a target UE to which an eUICC subscription is transferred, and the second UE is a source UE from which the eUICC subscription is transferred; and the processor 151 is configured to transfer the eUICC subscription from the second UE to the first UE according to the subscription transfer request message, so that the first UE accesses an operator network according to transferred eUICC subscription data.

Further, the network interface 152 is further configured to send an authentication request message to an SP device, so that the SP device determines whether to allow the eUICC subscription transfer.

The network interface 152 is further configured to receive an authentication response message sent by the SP device.

Further, optionally, the network interface 152 is further configured to send a data transfer command message to the second UE.

The network interface 152 is further configured to receive user data that is sent by the second UE according to the data transfer command message, where the user data includes user data stored in an eUICC of the second UE and/or user data stored in a storage unit of the second UE.

Further, the network interface 152 is further configured to send the user data to the first UE.

Further, the network interface 152 is further configured to send a data deletion command to the second UE, so that the second UE deletes the subscription data stored in the eUICC.

Further, the processor 151 may be configured to send a subscription transfer notification message to a device in an MNO network, where the subscription transfer notification message includes identity information of the first UE and identity information of the second UE, so that the device in the MNO network replaces the identity information of the second UE in the subscription data with the identity information of the first UE; receive a subscription transfer acknowledgement message fed back by the device in the MNO network; send an OP request message that includes the identity information of the first UE and the identity information of the second UE to an SM-DP module, so that the SM-DP module replaces the identity information of the second UE corresponding to an OP with the identity information of the first UE to obtain an updated OP; and receive the updated OP sent by the SM-DP module, and send the updated OP to the first UE.

Further, the processor 151 may be configured to send a subscription modification request message that includes identity information of the first UE and identity information of the second UE to a device in an MNO network, so that the device in the MNO network assigns new network access authentication parameters to the first UE, uses the new network access authentication parameters and the identity information of the first UE to replace network access authentication parameters corresponding to the second UE and the identity information of the second UE in the subscription data, and uses the new network access authentication parameters and the identity information of the first UE to request an SM-DP module to generate an OP corresponding to the first UE; receive a subscription transfer acknowledgement message fed back by the device in the MNO network; send an OP request message that includes the identity information of the first UE to the SM-DP module; and receive an OP sent by the SM-DP module, and send the OP to the first UE.

For some or all of messages involved in this embodiment, the messages may be generated by the processor 151 of the subscription transfer apparatus, or another component/module, or the processor 151 in combination with another component/module.

The SM-SR module provided by this embodiment may be configured to execute the part executed by the SM-SR module in the technical solution of any one of the method embodiments shown in FIG. 1 to FIG. 5. The implementation principle and technical effect thereof are similar, and are not further described herein. FIG. 15 is only one schematic structural diagram of the subscription transfer apparatus according to the present invention. The specific structure may be adjusted according to an actual situation.

Figure 16:
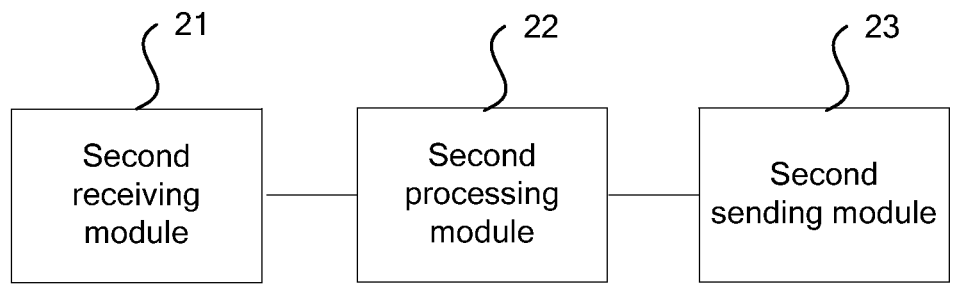
FIG. 16 is a schematic structural diagram of Embodiment 1 of a device in an MNO network according to the present invention.

FIG. 16 is a schematic structural diagram of Embodiment 1 of a device in an MNO network according to the present invention. As shown in FIG. 16, the device in an MNO network in this embodiment includes a second receiving module 21, a second processing module 22, and a second sending module 23. The second receiving module 21 is configured to receive a subscription transfer notification message sent by an SM-SR module, where the subscription transfer notification message includes identity information of a first UE and identity information of a second UE, where the first UE is a target UE to which an eUICC subscription is transferred, and the second UE is a source UE from which the eUICC subscription is transferred; the second processing module 22 is configured to replace the identity information of the second UE in subscription data with the identity information of the first UE; and the second sending module 23 is configured to feed back a subscription transfer acknowledgement message to the SM-SR module, so that upon reception of the subscription transfer acknowledgement message, the SM-SR module uses an OP request message that includes the identity information of the first UE and the identity information of the second UE to request an SM-DP module to replace the identity information of the second UE corresponding to an OP with the identity information of the first UE to obtain an updated OP, and receives the updated OP sent by the SM-DP module, and then sends the updated OP to the first UE.

The device in an MNO network in this embodiment may be configured to execute the technical solution of the method embodiment shown in FIG. 9. The implementation principle and technical effect thereof are similar, and are not further described herein.

Figure 17:
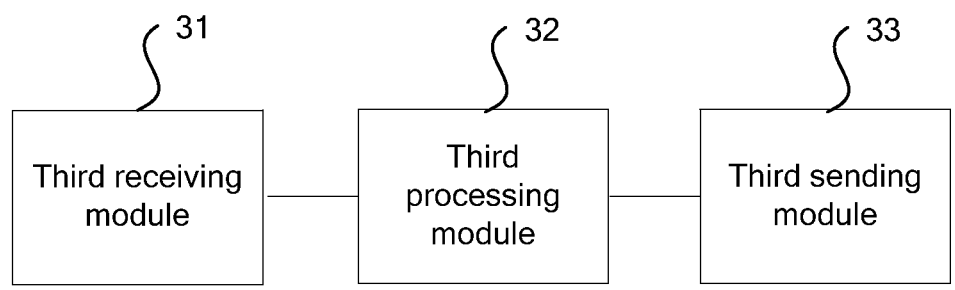
FIG. 17 is a schematic structural diagram of Embodiment 2 of a device in an MNO network according to the present invention.

FIG. 17 is a schematic structural diagram of Embodiment 2 of a device in an MNO network according to the present invention. As shown in FIG. 17, the device in an MNO network in this embodiment includes a third receiving module 31, a third processing module 32, and a third sending module 33. The third receiving module 31 is configured to receive a subscription modification request message that is sent by an SM-SR module and includes identity information of a first UE and identity information of a second UE, where the first UE is a target UE to which an eUICC subscription is transferred, and the second UE is a source UE from which the eUICC subscription is transferred; the third processing module 32 is configured to assign new network access authentication parameters to the first UE, and use the new network access authentication parameters and the identity information of the first UE to replace network access authentication parameters corresponding to the second UE and the identity information of the second UE in subscription data; and the third sending module 33 is configured to send an OP request message that includes the new network access authentication parameters and the identity information of the first UE to an SM-DP module, so that the SM-DP module generates an OP corresponding to the first UE; where the third sending module 33 is further configured to feed back a subscription transfer acknowledgement message to the SM-SR module, so that upon reception of the subscription transfer acknowledgement message, the SM-SR module sends an OP request message that includes the identity information of the first UE to the SM-DP module, receives the OP sent by the SM-DP module, and sends the OP to the first UE.

The device in an MNO network in this embodiment may be configured to execute the technical solution of the method embodiment shown in FIG. 10. The implementation principle and technical effect thereof are similar, and are not further described herein.

Figure 18:
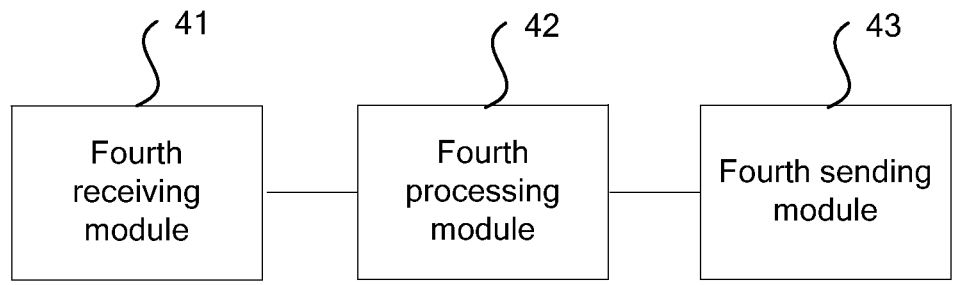
FIG. 18 is a schematic structural diagram of Embodiment 1 of an SM-DP module according to the present invention.

FIG. 18 is a schematic structural diagram of Embodiment 1 of an SM-DP module according to the present invention. As shown in FIG. 18, the SM-DP module in this embodiment includes a fourth receiving module 41, a fourth processing module 42, and a fourth sending module 43. The fourth receiving module 41 is configured to receive an OP request message that is sent by an SM-SR module and includes identity information of a first UE and identity information of a second UE, where the first UE is a target UE to which an eUICC subscription is transferred, and the second UE is a source UE from which the eUICC subscription is transferred; the fourth processing module 42 is configured to replace the identity information of the second UE corresponding to an OP with the identity information of the first UE to obtain an updated OP; and the fourth sending module 43 is configured to send the updated OP to the SM-SR module, so that the SM-SR module sends the updated OP to the first UE.

The SM-DP module in this embodiment may be configured to execute the technical solution of the method embodiment shown in FIG. 11. The implementation principle and technical effect thereof are similar, and are not further described herein.

Figure 19:
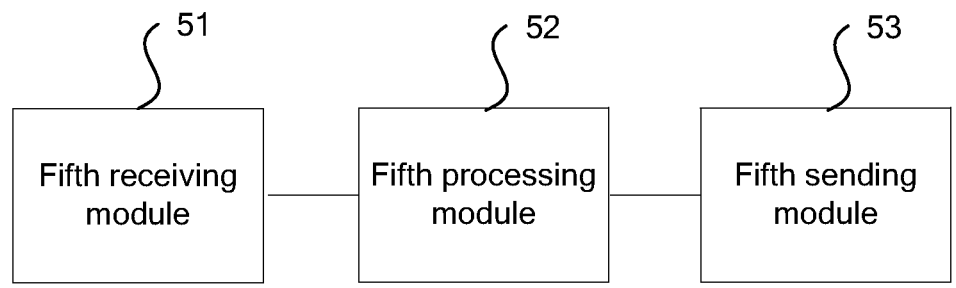
FIG. 19 is a schematic structural diagram of Embodiment 2 of an SM-DP module according to the present invention.

FIG. 19 is a schematic structural diagram of Embodiment 2 of an SM-DP module according to the present invention. As shown in FIG. 19, the SM-DP module in this embodiment includes a fifth receiving module 51, a fifth processing module 52, and a fifth sending module 53. The fifth receiving module 51 is configured to receive an OP request message, which is sent by a device in an MNO network after network access authentication parameters corresponding to a second UE and identity information of the second UE in subscription data are replaced with new network access authentication parameters and identity information of a first UE and which includes the new network access authentication parameters and the identity information of the first UE, where the new network access authentication parameters are network access authentication parameters assigned to the first UE after the device in the MNO network receives a subscription modification request message that is sent by an SM-SR module and that includes the identity information of the first UE and the identity information of the second UE, the first UE is a target UE to which an eUICC subscription is transferred, and the second UE is a source UE from which the eUICC subscription is transferred; the fifth processing module 52 is configured to generate, according to the new network access authentication parameters and the identity information of the first UE, an OP corresponding to the first UE; the fifth receiving module 51 is further configured to receive an OP request message that is sent by the SM-SR module and includes the identity information of the first UE; and the fifth sending module 53 is configured to send the OP corresponding to the first UE to the SM-SR module, so that the SM-SR module sends the OP to the first UE.

The SM-DP module in this embodiment may be configured to execute the technical solution of the method embodiment shown in FIG. 12. The implementation principle and technical effect thereof are similar, and are not further described herein.

Figure 20:
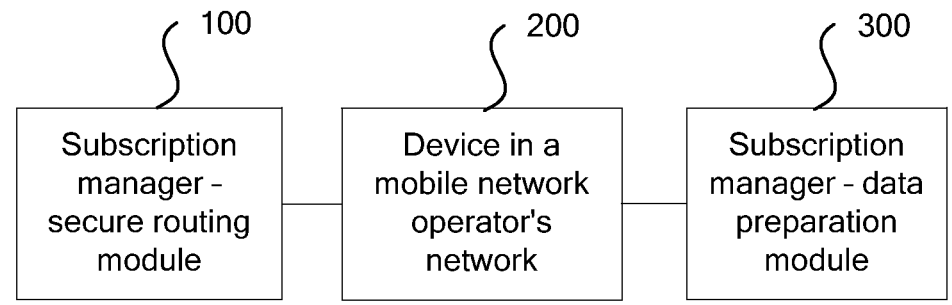
FIG. 20 is a schematic structural diagram of Embodiment 1 of a system according to the present invention.

FIG. 20 is a schematic structural diagram of Embodiment 1 of a system according to the present invention. The system in this embodiment includes the SM-SR module 100 in any one of Embodiments 1 to 4 of the SM-SR module, and/or the device 200 in an MNO network in Embodiment 1 of the device in an MNO network, and/or the SM-DP module 300 in Embodiment 1 of the SM-DP module.

In Embodiment 2 of a system provided by the present invention, the system in this embodiment includes the SM-SR module in any embodiment of Embodiments 1 to 3 or Embodiment 5 of the SM-SR module, and/or the device in an MNO network in Embodiment 2 of the device in the MNO network, and/or the SM-DP module in Embodiment 2 of the SM-DP module.

It should be noted that the schematic structural diagrams corresponding to the foregoing embodiments are only exemplary, and connection relationships between parts or modules are not limited to the forms shown in the figures, and may be subject to a situation in actual application.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disc, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A subscription transfer method, comprising:
   receiving a subscription transfer request message sent by a first user equipment (UE) or a second UE, wherein the first UE is a target UE to which an embedded universal integrated circuit card (eUICC) subscription is transferred, and the second UE is a source UE from which the eUICC subscription is transferred;
   sending an authentication request message to a service provider (SP) device to prompt the SP device to determine whether to allow the eUICC subscription transfer;
   receiving, in response to the sending the authentication request message, an authentication response message sent by the SP device and indicating that the eUICC subscription transfer is allowed; and
   transferring, after the receiving the authentication response message, the eUICC subscription from the second UE to the first UE according to the subscription transfer request message such that the first UE accesses an operator network according to transferred eUICC subscription data.

2. The method according to claim 1, wherein before transferring the eUICC subscription from the second UE to the first UE according to the subscription transfer request message, the method further comprises:
   sending a data transfer command message to the second UE; and
   receiving user data that is sent by the second UE according to the data transfer command message, wherein the user data comprises user data stored in an eUICC of the second UE and/or user data stored in a storage unit of the second UE.

3. The method according to claim 2, further comprising sending the user data to the first UE.

4. The method according to claim 1, wherein after transferring the eUICC subscription from the second UE to the first UE, the method further comprises sending a data deletion command to the second UE such that the second UE deletes the subscription data stored in the eUICC.

5. The method according to claim 1, wherein transferring the eUICC subscription from the second UE to the first UE according to the subscription transfer request message comprises:
   sending a subscription modification request message that comprises identity information of the first UE and identity information of the second UE to a device in a mobile network operator (MNO) network such that the device in the MNO network assigns new network access authentication parameters to the first UE, uses the new network access authentication parameters and the identity information of the first UE to replace network access authentication parameters corresponding to the second UE and the identity information of the second UE in the subscription data, and uses the new network access authentication parameters and the identity information of the first UE to request a subscription manager-data preparation (SM-DP) component to generate an operational profiled (OP) corresponding to the first UE;

receiving a subscription transfer acknowledgement message fed back by the device in the MNO network;

sending an OP request message that comprises the identity information of the first UE to the SM-DP component;

receiving an OP sent by the SM-DP component; and sending the OP to the first UE.

6. A subscription transfer method, comprising:

receiving a subscription transfer request message sent by a first user equipment (UE) or a second UE, wherein the first UE is a target UE to which an embedded universal integrated circuit card (eUICC) subscription is transferred, and the second UE is a source UE from which the eUICC subscription is transferred; and transferring the eUICC subscription from the second UE to the first UE according to the subscription transfer request message such that the first UE accesses an operator network according to transferred eUICC subscription data, wherein transferring the eUICC subscription from the second UE to the first UE according to the subscription transfer request message comprises:

sending a subscription transfer notification message to a device in a mobile network operator (MNO) network, wherein the subscription transfer notification message comprises identity information of the first UE and identity information of the second UE such that the device in the MNO network replaces the identity information of the second UE in the subscription data with the identity information of the first UE;

receiving a subscription transfer acknowledgement message fed back by the device in the MNO network;

sending an operational profile (OP) request message that comprises the identity information of the first UE and the identity information of the second UE to a subscription manager-data preparation (SM-DP) component such that the SM-DP component replaces the identity information of the second UE corresponding to an OP with the identity information of the first UE to obtain an updated OP;

receiving the updated OP sent by the SM-DP component; and sending the updated OP to the first UE.

7. A subscription manager-secure router, comprising:

a first receiver configured to receive a subscription transfer request message sent by a first user equipment (UE) or a second UE, wherein the first UE is a target UE to which an embedded universal integrated circuit card (eUICC) subscription is transferred, and the second UE is a source UE from which the eUICC subscription is transferred;

a first transmitter configured to send an authentication request message to a service provider (SP) device to prompt the SP device to determine whether to allow the eUICC subscription transfer, wherein the first receiving component is further configured to receive, in response to the sending the authentication request message, an authentication response message sent by the SP device and indicating that the eUICC subscription transfer is allowed; and a first processor coupled to the first receiver and the first transmitter and configured to transfer, after receiving the authentication response message, the eUICC subscription from the second UE to the first UE according to the subscription transfer request message such that the first UE accesses an operator network according to transferred eUICC subscription data.

8. The subscription manager-secure router according to claim 7, wherein the first transmitter is further configured to send a data transfer command message to the second UE before the first processor transfers the eUICC subscription from the second UE to the first UE, and wherein the first receiver is further configured to receive user data that is sent by the second UE according to the data transfer command message, and wherein the user data comprises user data stored in an eUICC of the second UE and/or user data stored in a storage unit of the second UE.

9. The subscription manager-secure router according to claim 7, wherein the first processor is configured to:

send a subscription transfer notification message to a device in a mobile network operator (MNO) network, wherein the subscription transfer notification message comprises identity information of the first UE and identity information of the second UE such that the device in the MNO network replaces the identity information of the second UE in the subscription data with the identity information of the first UE;

receive a subscription transfer acknowledgement message fed back by the device in the MNO network;

send an operational profile (OP) request message that comprises the identity information of the first UE and the identity information of the second UE to a subscription manager-data preparation (SM-DP) component such that the SM-DP component replaces the identity information of the second UE corresponding to an OP with the identity information of the first UE to obtain an updated OP;

receive the updated OP sent by the SM-DP component; and send the updated OP to the first UE.

10. A subscription manager-secure router, comprising:

a first receiver configured to receive a subscription transfer request message sent by a first user equipment (UE) or a second UE, wherein the first UE is a target UE to which an embedded universal integrated circuit card (eUICC) subscription is transferred, and wherein the second UE is a source UE from which the eUICC subscription is transferred; and a first processor configured to:

transfer the eUICC subscription from the second UE to the first UE according to the subscription transfer request message such that the first UE accesses an operator network according to transferred eUICC subscription data;

send a subscription modification request message that comprises identity information of the first UE and identity information of the second UE to a device in a mobile network operator (MNO) network such that the device in the MNO network assigns new network access authentication parameters to the first UE, uses the new network access authentication parameters and the identity information of the first UE to replace network access authentication parameters corresponding to the second UE and the identity information of the second UE in the subscription data, and uses the new network access authentication parameters and the identity information of the first UE to request a subscription manager-data preparation (SM-DP) component to generate an operational profile (OP) corresponding to the first UE;

receive a subscription transfer acknowledgement message fed back by the device in the MNO network;

send an OP request message that comprises the identity information of the first UE to the SM-DP component;

receive an OP sent by the SM-DP component; and send the OP to the first UE.

* * * * *